(12) United States Patent
    Ikenuma

(10) Patent No.: US 11,735,738 B2
(45) Date of Patent: Aug. 22, 2023

(54) METHOD FOR FORMING ELECTRODE, ELECTRODE, STORAGE BATTERY, AND ELECTRIC DEVICE

(71) Applicant: SEMICONDUCTOR ENERGY LABORATORY CO., LTD., Atsugi (JP)

(72) Inventor: Tatsuya Ikenuma, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 17/511,108

(22) Filed: Oct. 26, 2021

(65) Prior Publication Data

US 2022/0045330 A1   Feb. 10, 2022

Related U.S. Application Data

(63) Continuation of application No. 14/722,795, filed on May 27, 2015, now Pat. No. 11,165,066.

(30) Foreign Application Priority Data

May 29, 2014 (JP) .................. 2014-111254

(51) Int. Cl.
    *H01M 4/62* (2006.01)
    *H01M 4/04* (2006.01)
    (Continued)

(52) U.S. Cl.
    CPC ......... *H01M 4/623* (2013.01); *H01M 4/0404* (2013.01); *H01M 4/049* (2013.01);
    (Continued)

(58) Field of Classification Search
    CPC .... H01M 4/623; H01M 4/0404; H01M 4/049; H01M 4/13; H01M 4/139; H01M 4/625; H01M 4/663; H01M 4/667; H01M 4/661
    See application file for complete search history.

(56) References Cited

U.S. PATENT DOCUMENTS

| 4,302,518 A | 11/1981 | Goodenough et al. |
| 4,668,595 A | 5/1987 | Yoshino et al. |
| (Continued) | | |

FOREIGN PATENT DOCUMENTS

| CN | 001275581 A | 12/2000 |
| CN | 001324122 A | 11/2001 |
| (Continued) | | |

OTHER PUBLICATIONS

Chinese Office Action (Application No. 202010630796.4) dated Oct. 28, 2022.
(Continued)

*Primary Examiner* — Eugenia Wang
(74) *Attorney, Agent, or Firm* — Nixon Peabody LLP; Jeffrey L. Costellia

(57) ABSTRACT

An electrode improved for achieving a storage battery having both a high electrode strength and favorable electrode conductivity is provided. The electrode includes graphene and a modified polymer in an active material layer or includes a layer substantially formed of carbon particles and an active material layer including a modified polymer over a current collector. The modified polymer has a poly(vinylidene fluoride) structure and partly has a polyene structure or an aromatic ring structure. The polyene structure or the aromatic ring structure is sandwiched between poly(vinylidene fluoride) structures.

10 Claims, 14 Drawing Sheets

(51) Int. Cl.
*H01M 4/66* (2006.01)
*H01M 4/139* (2010.01)
*H01M 10/052* (2010.01)
*H01M 4/13* (2010.01)

(52) U.S. Cl.
CPC .............. *H01M 4/13* (2013.01); *H01M 4/139* (2013.01); *H01M 4/625* (2013.01); *H01M 4/663* (2013.01); *H01M 4/666* (2013.01); *H01M 4/667* (2013.01); *H01M 10/052* (2013.01); *H01M 4/661* (2013.01); *Y02E 60/10* (2013.01); *Y02T 10/70* (2013.01)

(56) References Cited

U.S. PATENT DOCUMENTS

| | | |
|---|---|---|
| 5,783,333 A | 7/1998 | Mayer |
| 5,871,866 A | 2/1999 | Barker et al. |
| 5,910,382 A | 6/1999 | Goodenough et al. |
| 6,085,015 A | 7/2000 | Armand et al. |
| 6,200,703 B1 | 3/2001 | Kashio et al. |
| 6,514,640 B1 | 2/2003 | Armand et al. |
| 7,179,561 B2 | 2/2007 | Niu et al. |
| 7,572,542 B2 | 8/2009 | Naoi |
| 7,658,901 B2 | 2/2010 | Prud'Homme.R et al. |
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 8,317,984 B2 | 11/2012 | Gilje |
| 8,883,351 B2 | 11/2014 | Todoriki et al. |
| 9,293,770 B2 | 3/2016 | Todoriki et al. |
| 2001/0010807 A1 | 8/2001 | Matsubara |
| 2002/0001721 A1 | 1/2002 | Barriere et al. |
| 2002/0102459 A1 | 8/2002 | Hosoya et al. |
| 2002/0195591 A1 | 12/2002 | Ravet et al. |
| 2004/0175526 A1 | 9/2004 | Corveleyn et al. |
| 2006/0051671 A1 | 3/2006 | Thackeray et al. |
| 2007/0009799 A1 | 1/2007 | Zheng |
| 2007/0117013 A1 | 5/2007 | Hosoya et al. |
| 2007/0131915 A1 | 6/2007 | Stankovich et al. |
| 2008/0048153 A1 | 2/2008 | Naoi |
| 2008/0254296 A1 | 10/2008 | Handa et al. |
| 2009/0110627 A1 | 4/2009 | Choi et al. |
| 2009/0117467 A1 | 5/2009 | Zhamu et al. |
| 2009/0123850 A1 | 5/2009 | Takeuchi et al. |
| 2009/0202915 A1 | 8/2009 | Modekl et al. |
| 2009/0253045 A1 | 10/2009 | Kotato et al. |
| 2009/0305135 A1 | 12/2009 | Shi et al. |
| 2010/0035093 A1 | 2/2010 | Ruoff et al. |
| 2010/0055025 A1 | 3/2010 | Jang et al. |
| 2010/0081057 A1 | 4/2010 | Liu et al. |
| 2010/0105834 A1 | 4/2010 | Tour et al. |
| 2010/0143798 A1 | 6/2010 | Zhamu et al. |
| 2010/0176337 A1 | 7/2010 | Zhamu et al. |
| 2010/0233538 A1 | 9/2010 | Nesper et al. |
| 2010/0233546 A1 | 9/2010 | Nesper et al. |
| 2010/0248034 A1 | 9/2010 | Oki et al. |
| 2010/0266882 A1 | 10/2010 | Igarashi et al. |
| 2010/0301279 A1 | 12/2010 | Nesper et al. |
| 2010/0303706 A1 | 12/2010 | Wallace et al. |
| 2010/0308277 A1 | 12/2010 | Grupp |
| 2010/0330421 A1 | 12/2010 | Cui et al. |
| 2011/0012067 A1 | 1/2011 | Kay |
| 2011/0111303 A1 | 5/2011 | Kung et al. |
| 2011/0121240 A1 | 5/2011 | Amine et al. |
| 2011/0136019 A1 | 6/2011 | Amiruddin et al. |
| 2011/0159372 A1 | 6/2011 | Zhamu et al. |
| 2011/0227000 A1 | 9/2011 | Ruoff et al. |
| 2011/0229795 A1 | 9/2011 | Niu et al. |
| 2011/0256437 A1 | 10/2011 | Katsuki et al. |
| 2012/0045692 A1 | 2/2012 | Takemura et al. |
| 2012/0058397 A1 | 3/2012 | Zhamu et al. |
| 2012/0064409 A1 | 3/2012 | Zhamu et al. |
| 2012/0064665 A1 | 3/2012 | Yamazaki |
| 2012/0088151 A1 | 4/2012 | Yamazaki et al. |
| 2012/0088156 A1 | 4/2012 | Nomoto et al. |
| 2012/0100402 A1 | 4/2012 | Nesper et al. |
| 2012/0308884 A1 | 12/2012 | Oguni et al. |
| 2012/0308891 A1 | 12/2012 | Todoriki et al. |
| 2012/0315550 A1 | 12/2012 | Liu et al. |
| 2013/0045156 A1 | 2/2013 | Nomoto et al. |
| 2013/0047423 A1 | 2/2013 | Miwa et al. |
| 2013/0084384 A1 | 4/2013 | Yamakajl |
| 2013/0156942 A1 | 6/2013 | Yamakajl et al. |
| 2013/0266859 A1 | 10/2013 | Todoriki et al. |
| 2013/0266869 A1 | 10/2013 | Todoriki et al. |
| 2013/0295458 A1 | 11/2013 | Yokouchi et al. |
| 2013/0337320 A1 | 12/2013 | Yukawa |
| 2014/0099544 A1 | 4/2014 | Hosokawa et al. |
| 2014/0113200 A1 | 4/2014 | Seymour |
| 2016/0204440 A1 | 7/2016 | Todoriki et al. |
| 2019/0067701 A1 | 2/2019 | Todoriki et al. |

FOREIGN PATENT DOCUMENTS

| | | |
|---|---|---|
| CN | 102544502 A | 7/2012 |
| JP | 08-096801 A | 4/1996 |
| JP | 10-255808 A | 9/1998 |
| JP | 11-260353 A | 9/1999 |
| JP | 2002-075378 A | 3/2002 |
| JP | 2002-110162 A | 4/2002 |
| JP | 2002-246013 A | 8/2002 |
| JP | 2004-071518 A | 3/2004 |
| JP | 2005-310658 A | 11/2005 |
| JP | 3966570 | 8/2007 |
| JP | 2009-266466 A | 11/2009 |
| JP | 2011-150866 A | 8/2011 |
| JP | 2013-110100 A | 6/2013 |
| JP | 2014-007141 A | 1/2014 |
| JP | 2014-010981 A | 1/2014 |
| KR | 2007-0083086 A | 8/2007 |
| KR | 2011-0116972 A | 10/2011 |
| WO | WO-2006/071076 | 7/2006 |
| WO | WO-2012/096189 | 7/2012 |
| WO | WO-2012/173213 | 12/2012 |
| WO | WO-2013/153931 | 10/2013 |

OTHER PUBLICATIONS

Zhang.J et al., "Reduction of graphene oxide via L-ascorbic acid", Chemical Communications, 2010, vol. 46, No. 7, pp. 1112-1114.

Park.S et al., "Chemical structures of hydrazine-treated graphene oxide and generation of aromatic nitrogen doping", Nature Communications, Jan. 24, 2012, vol. 3, pp. 638-1-638-8.

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Zhou.X et al., "Graphene modified LIFePO4 cathode materials for high power lithium ion batteries", J. Mater. Chem. (Journal of Materials Chemistry), 2011, vol. 21, pp. 3353-3358.

Sundaram.R et al., "Electrochemical Modification of Graphene", Adv. Mater. (Advanced Materials), Jul. 7, 2008, vol. 20, No. 16, pp. 3050-3053.

Zhou.M et al., "Controlled Synthesis of Large-Area and Patterned Electrochemically Reduced Graphene Oxide Films", Chemistry a European Journal, May 14, 2009, vol. 15, No. 25, pp. 6116-6120.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8378-8384.

Wang.D et al., "Self-Assembled TIO2-Graphene Hybrid Nanostructures for Enhanced Li-Ion Insertion", ACS NANO, 2009, vol. 3, No. 4, pp. 907-914.

(56) References Cited

OTHER PUBLICATIONS

Shao.Y et al., "Facile and controllable electrochemical reduction of graphene oxide and its applications", J. Mater. Chem. (Journal of Materials Chemistry), 2010, vol. 20, No. 4, pp. 743-748.
Su.F et al., "Flexible and planar graphene conductive additives for lithium-ion batteries", J. Mater. Chem. (Journal of Materials Chemistry), 2010, vol. 20, pp. 9644-9650.
Yu.G et al., "Solution-Processed Graphene/MnO2 Nanostructured Textiles for High-Performance Electrochemical Capacitors", NANO Letters, 2011, vol. 11, No. 7, pp. 2905-2911.
Todoriki.H et al., "High performance lithium ion battery using Graphene Net electrode", 222nd ECS Meeting Abstract, Oct. 7, 2012, p. 1014, ECS.
Wang.Z et al., "Direct Electrochemical Reduction of Single-Layer Graphene Oxide and Subsequent Functionalization with Glucose Oxidase", J. Phys. Chem. C (The Journal of Physical Chemistry C), 2009, vol. 113, No. 32, pp. 14071-14075.
Mattevi.C et al., "Evolution of electrical, chemical, and structural properties of transparent and conducting chemically derived graphene thin films", Adv. Funct. Mater. (Advanced Functional Materials), Jun. 8, 2009, vol. 19, No. 16, pp. 2577-2583.
Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.
Park.S et al., "Hydrazine-reduction of graphite-and graphene oxide", Carbon, Mar. 15, 2011, vol. 49, No. 9, pp. 3019-3023, Elsevier.
Dreyer.D et al., "The Chemistry of Graphene Oxide", Chemical Society Reviews, Nov. 3, 2009, vol. 39, No. 1, pp. 228-240.
Chinese Office Action (Application No. 201510283819.8) dated Nov. 5, 2018.
DISPERMAT stirrers(https://www.dispermat.com/stirrers.html).
IKA stirring(http://www.ikausa.com/application/stirring/).

METHOD FOR FORMING ELECTRODE, ELECTRODE, STORAGE BATTERY, AND ELECTRIC DEVICE

BACKGROUND OF THE INVENTION

1. Field of the Invention

One embodiment of the present invention relates to a method for forming a storage battery electrode.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

With the recent rapid spread of portable electronic devices such as mobile phones, smartphones, electronic book (e-book) readers, and portable game machines, secondary batteries for drive power sources have been increasingly required to be smaller and to have higher capacity. Storage batteries typified by lithium-ion secondary batteries, which have advantages such as high energy density and high capacity, have been widely used as secondary batteries for portable electronic devices.

A lithium-ion secondary battery, which is one of storage batteries and widely used due to its high energy density, includes a positive electrode including an active material such as lithium cobalt oxide ($LiCoO_2$) or lithium iron phosphate ($LiFePO_4$), a negative electrode formed of a carbon material such as graphite capable of reception and release of lithium ions, a nonaqueous electrolytic solution in which a supporting electrolyte formed of a lithium salt such as $LiBF_4$ or $LiPF_6$ is dissolved in an organic solvent such as ethylene carbonate or diethyl carbonate, and the like. The lithium-ion secondary battery is charged and discharged in such a way that lithium ions in the secondary battery move between the positive electrode and the negative electrode through the nonaqueous electrolytic solution and inserted into or extracted from the active materials of the positive electrode and the negative electrode. In particular, Patent Document 1 is very highly evaluated as a document that discloses a rocking-chair lithium-ion battery.

Here, the structure of a commonly used battery electrode is described. The electrode includes, over a current collector that is a conductive support, an active material layer which includes inorganic compound particles serving as an active material and a binder for keeping the shape of the electrode. As the binder, an organic polymer is used. Since the binder needs to be electrochemically stable, poly(vinylidene fluoride) (PVdF), which is a ferroelectric polymer, or styrene-butadiene rubber (SBR), which is one kind of synthetic rubber, are often used. Furthermore, in order to apply a voltage evenly to the electrode, a conductive additive is added to the active material layer. As the conductive additive, a carbon material, especially carbon black is chiefly used in terms of electrochemical stability. The active material particles included in the active material layer that stably keeps the shape owing to the binder, the conductive additive, and the like are electrically connected in parallel to each other.

However, the materials that are known to be stably available as a binder are insulators, and the carbon material that is used as the conductive additive has little binding force. The electrode is required to have holes for including an electrolytic solution that transfers carrier ions or to have a certain degree of flexibility. Furthermore, if the active material layer is made thick enough for high capacity, various ohm resistances are applied and the reaction of the active material in the electrode tends to be uneven.

In view of these problems, in a known technique, the shape of a positive electrode where a high voltage is applied and the oxidation reaction tends to occur is stabilized and the conductivity thereof is secured by using PVdF, which is a ferroelectric polymer, as a binder and carbon black with a small particle diameter, typically acetylene black, as a conductive additive.

For example, Patent Document 2 discloses a technique for preventing the promotion of gelling of PVdF due to carbon black. In addition, Patent Document 3 discloses a combination of Ketjen Black (registered trademark), which is carbon black having a higher order structure, and PVdF or a copolymer including PVdF.

REFERENCE

Patent Document

[Patent Document 1] U.S. Reissue Pat. No. 4,668,595
[Patent Document 2] U.S. Pat. No. 6,200,703
[Patent Document 3] United States Patent Application Publication No. 2010/0266882

SUMMARY OF THE INVENTION

With the recent energy demand, further improvements in performance, that is, higher bonding force and lower electrode resistance, have been strongly required.

In consideration of the above problems, an object of one embodiment of the present invention is to provide a method for forming a storage battery electrode having an interaction between a binder and a conductive additive. An object is to provide a storage battery having a higher capacity per unit volume of an electrode with the use of a storage battery electrode formed by the above formation method.

In consideration of the above problems, an object of one embodiment of the present invention is to increase the electrode strength by modifying a polymer having a poly(vinylidene fluoride) structure in an active material layer and thereby increasing an interaction with graphene including oxygen. Another object is to reduce electrode resistance by modifying a polymer having a poly(vinylidene fluoride) structure and forming a composite material of the polymer and graphene including oxygen. Another object is to improve cycle performance by providing a storage battery including the above-described electrode. Note that the modification refers to elimination of hydrogen fluoride from the poly(vinylidene fluoride) structure. The modified structure refers to a polyene structure or an aromatic ring structure.

In consideration of the above problems, an object of one embodiment of the present invention is to modify a polymer having a poly(vinylidene fluoride) structure that is included in an electrode and thereby increase an interaction between the polymer and a carbon material having been subjected to reduction treatment. Furthermore, another object is to reduce electrode resistance by modifying a polymer having a poly(vinylidene fluoride) structure and forming a composite material of the modified polymer and a carbon material having been subjected to treatment with a reducing agent. Another object is to reduce interface resistance between a current collector and an active material layer and improve interface bonding strength by modifying a polymer having a poly(vinylidene fluoride) structure and performing treatment with a reducing agent on a carbon material in contact with the current collector. Note that the modification refers to elimination of hydrogen fluoride from the poly(vinylidene fluoride) structure. The modified structure refers to a polyene structure or an aromatic ring structure.

In consideration of the above problems, an object of one embodiment of the present invention is to provide a storage battery electrode that uses a polymer having a modified poly(vinylidene fluoride) structure and graphene including oxygen. Another object is to provide an electrode including an active material layer including a polymer having a modified poly(vinylidene fluoride) structure, a carbon black layer, and a current collector in contact with the carbon black layer. Another object is to provide a storage battery including the above-described electrode.

In consideration of the above problems, an object of one embodiment of the present invention is to provide a method for forming an electrode with improved strength by modifying a polymer having a poly(vinylidene fluoride) structure that is included in the electrode. Another object is to provide a method for forming an electrode having an improved electrode strength and a uniform electrode conductive path by performing reduction treatment on an electrode including a polymer having a poly(vinylidene fluoride) structure and graphene oxide. Another object is to provide a method for forming an electrode with improved bonding strength between a current collector and an active material layer by using a carbon black layer suitable for reduction treatment, a current collector in contact with the carbon black layer, and a reducing agent in appropriate combination.

Graphene is a carbon material having a crystal structure in which hexagonal skeletons of carbon are spread in a planar form and is one atomic plane extracted from graphite crystals. Due to its electrical, mechanical, or chemical characteristics which are surprisingly excellent, graphene has been expected to be used for a variety of fields of, for example, field-effect transistors with high mobility, highly sensitive sensors, highly-efficient solar cells, and next-generation transparent conductive films and has attracted a great deal of attention.

Note that graphene in this specification refers to single-layer grapheme or multilayer graphene including two or more and hundred or less layers. Single-layer grapheme refers to a one-atom-thick sheet of carbon molecules having π bonds. One sheet of graphene is referred to as a graphene flake. In addition, graphene oxide refers to a compound formed by oxidation of such graphene. When graphene oxide is reduced to form graphene (this is also referred to as elimination reaction in grapheme oxide), oxygen included in the grapheme oxide is not entirely eliminated and part of the oxygen remains in the grapheme, in some cases. When graphene includes oxygen, the ratio of oxygen measured by XPS in graphene is higher than or equal to 2 atomic % and lower than or equal to 20 atomic %, preferably higher than or equal to 3 atomic % and lower than or equal to 15 atomic %. Note that reduced grapheme oxide (RGO) is also included in grapheme.

In consideration of the above problems, an object of one embodiment of the present invention is to provide a novel electrode, a novel secondary battery, or a novel power storage device. Note that the descriptions of these objects do not disturb the existence of other objects. In one embodiment of the present invention, there is no need to achieve all of these objects. Other objects will be apparent from and can be derived from the description of the specification, the drawings, the claims, and the like.

In view of the above, one embodiment of the present invention is an electrode which includes an active material particle, graphene, and a polymer having a poly(vinylidene fluoride) structure. In the electrode, the polymer having a poly(vinylidene fluoride) structure partly has a polyene structure or an aromatic ring structure.

One embodiment of the present invention is an electrode which includes an active material layer including an active material particle and a polymer having a poly(vinylidene fluoride) structure, and a current collector including a metal foil and a layer substantially formed of a carbon particle. In the electrode, the polymer having a poly(vinylidene fluoride) structure partly has a polyene structure or an aromatic ring structure.

One embodiment of the present invention is an electrode which includes an active material layer including an active material particle, graphene, and a polymer having a poly(vinylidene fluoride) structure, and a current collector including a metal foil and a layer substantially formed of a carbon particle. In the electrode, the polymer having a poly(vinylidene fluoride) structure partly has a polyene structure or an aromatic ring structure.

One embodiment of the present invention is the electrode having any of the above-described structures, in which the polyene structure or the aromatic ring structure is provided between two poly(vinylidene fluoride) structures.

One embodiment of the present invention is the electrode having any of the above-described structures, in which graphene includes oxygen and the ratio of oxygen measured by XPS in graphene is higher than or equal to 1 atomic % and lower than or equal to 20 atomic %

One embodiment of the present invention is a storage battery which includes the electrode having any of the above-described structures and an electrolyte.

One embodiment of the present invention is an electric device which includes the storage battery having the above-described structure, and a housing, a display device, or a switch.

One embodiment of the present invention is a method for forming an electrode which includes the steps of forming an active material layer including an active material particle, graphene oxide, and a polymer having a poly(vinylidene fluoride) structure over a current collector; and immersing the current collector in an aqueous solution including a reducing agent to modify the polymer having a poly(vinylidene fluoride) structure by eliminating hydrogen fluoride.

One embodiment of the present invention is a method for forming an electrode, which includes the steps of forming a current collector by providing a layer substantially formed of a carbon particle over a metal foil, forming an active material layer including graphene oxide and a polymer having a poly(vinylidene fluoride) structure over the current collector, and immersing the current collector in an aqueous solution including a reducing agent to modify the polymer having a poly(vinylidene fluoride) structure by eliminating hydrogen fluoride.

One embodiment of the present invention is the method for forming an electrode with any of the above-described structures, in which the reducing agent is a material having a LUMO level of higher than or equal to −5.0 eV and lower than or equal to −3.8 eV.

One embodiment of the present invention is the method for forming an electrode in any of the above-described structures, in which the reducing agent is a material having a reduction potential of higher than or equal to −0.4 V and lower than or equal to +0.8 V with respect to the potential of a saturated calomel electrode.

One embodiment of the present invention is a method for forming an electrode, which includes the steps of forming an active material layer which includes a composite particle including an active material and graphene and a polymer having a poly(vinylidene fluoride) structure over a current collector, and immersing the active material layer in pure water or an aqueous solution to modify the polymer having a poly(vinylidene fluoride) structure by eliminating hydrogen fluoride.

One embodiment of the present invention is a method for forming an electrode, which includes the steps of forming a current collector by providing a layer substantially formed of a carbon particle over a metal foil, forming an active material layer including an active material particle and a polymer having a poly(vinylidene fluoride) structure over the current collector, and immersing the active material layer in pure water or an aqueous solution to eliminate hydrogen fluoride from the polymer having a poly(vinylidene fluoride) structure.

One embodiment of the present invention is the method for forming an electrode with any of the above-described structures, in which a polyene structure or an aromatic ring structure is formed from the poly(vinylidene fluoride) structure by eliminating hydrogen fluoride.

One embodiment of the present invention is the method for forming an electrode in any of the above-described structures, in which the aqueous solution has a pKb of more than pKa−4 and less than pKa+4.

One embodiment of the present invention is the method for forming an electrode in any of the above-described structures, in which the aqueous solution has a pH of more than 5 and less than 9.

With one embodiment of the present invention, an electrode having both a high electrode strength and favorable electric conductivity can be provided.

With one embodiment of the present invention, an electrode having both strong bonding between a current collector and an active material layer and stably low electrode interface resistance can be provided.

With one embodiment of the present invention, a storage battery having a high electrode capacity, high-speed charge and discharge characteristics, and improved cycle performance can be provided.

With one embodiment of the present invention, a novel electrode, a novel secondary battery, or a novel power storage device can be provided. Note that one embodiment of the present invention is not limited to these effects. One embodiment of the present invention may have effects other than the above-described effects depending on circumstances. Depending on circumstances or conditions, one embodiment of the present invention might not have any of the above-described effects.

BRIEF DESCRIPTION OF THE DRAWINGS

In the accompanying drawings.

DETAILED DESCRIPTION OF THE INVENTION

Embodiments will be described below with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Embodiment 1

In this embodiment, a method for forming a storage battery electrode of one embodiment of the present invention will be described with reference to FIGS. 1A to 1C.

Figure 1A:
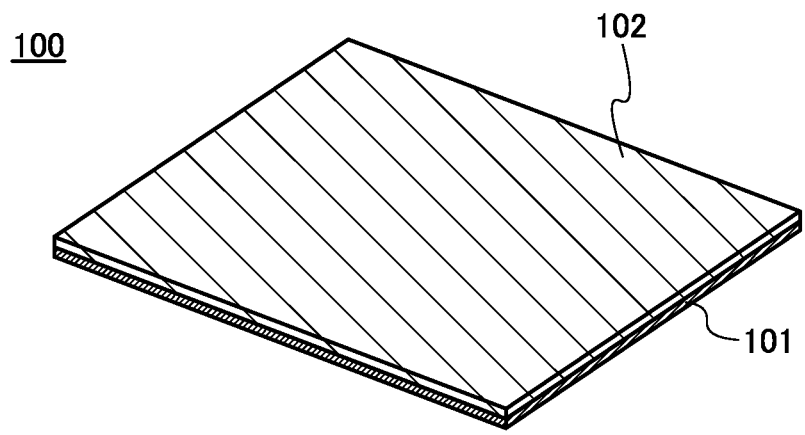
FIGS. 1A to 1C illustrate a storage battery electrode.
Figure 1B:
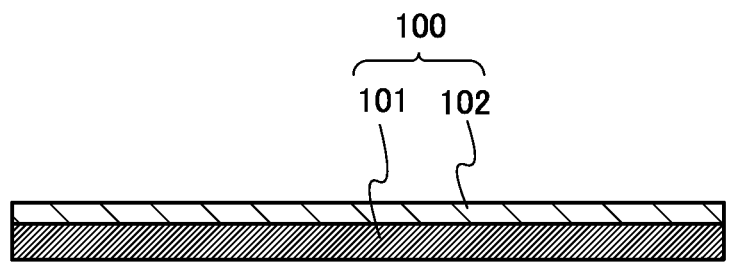

FIG. 1A is a perspective view of a storage battery electrode 100, and FIG. 1B is a longitudinal sectional view of the storage battery electrode 100. Although the storage battery electrode 100 in the shape of a rectangular sheet is illustrated in FIG. 1A, the shape of the storage battery electrode 100 is not limited thereto and may be any appropriate shape. An active material layer 102 is formed over only one surface of a current collector 101 in FIGS. 1A and 1B; however, active material layers 102 may be formed so that the current collector 101 is sandwiched therebetween. The active material layer 102 does not necessarily need to be formed over the entire surface of the current collector 101 and a region that is not coated, such as a region for connection to an electrode tab, is provided as appropriate.

There is no particular limitation on the current collector used as a positive-electrode current collector or a negative-electrode current collector as long as it has high conductivity without causing a significant chemical change in a power storage device. For example, the current collector can be formed using a metal such as gold, platinum, iron, nickel, copper, aluminum, titanium, tantalum, or manganese, or an alloy thereof (e.g., stainless steel). Alternatively, silicon, neodymium, scandium, molybdenum, or the like may be added to the above-described metal or the alloy to improve heat resistance. Alternatively, the above-described metal or the alloy that is coated with carbon, nickel, titanium, or the like may be used. The current collector can each have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The current collector may be formed to have micro irregularities on the surface thereof in order to enhance adhesion to the active material. The current collector preferably has a thickness of more than or equal to 5 μm and less than or equal to 30 μm.

Figure 1C:
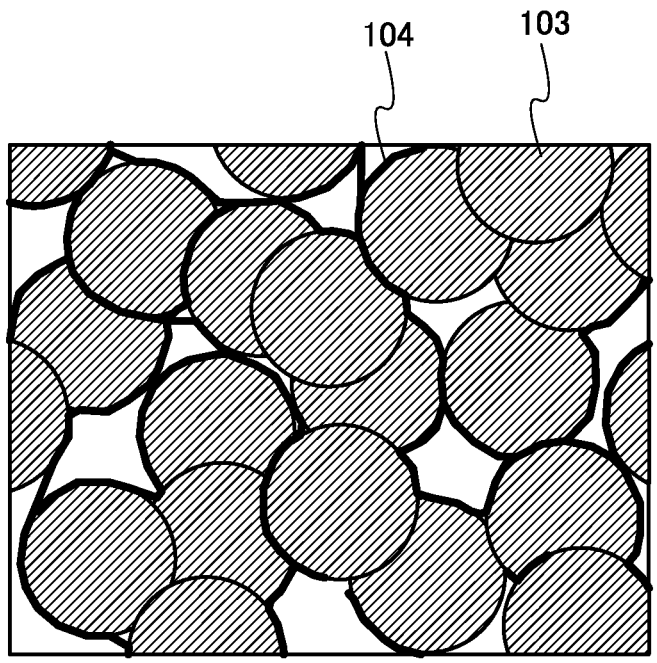

FIG. 1C is a longitudinal sectional view of the active material layer 102. The active material layer 102 includes active material particles 103, graphene flakes 104 that are graphene serving as a conductive additive, and a binder (not illustrated).

The longitudinal section of the active material layer 102 in FIG. 1C shows substantially uniform dispersion of the sheet-like graphene flakes 104 in the active material layer 102. The graphene flakes 104 are schematically shown by heavy lines in FIG. 1C but are actually thin films each having a thickness corresponding to the thickness of a single layer or a multiple layer of carbon molecules. The plurality of graphene flakes 104 are formed in such a way as to wrap, coat, or be adhered to a plurality of the active material particles 103, so that the graphene flakes 104 make surface contact with the active material particles 103. Further, the graphene flakes 104 are also in surface contact with each other; consequently, the plurality of graphene flakes 104 form a three-dimensional network for electric conduction.

This is because graphene oxide with extremely high dispersibility in a polar solvent is used for formation of graphene. The solvent is removed by volatilization from a dispersion medium including uniformly dispersed graphene oxide and the graphene oxide is reduced to give graphene; hence, the graphene flakes 104 remaining in the active material layer 102 partly overlap with each other and are dispersed such that the surface contact is made, thereby forming a path for electric conduction.

Unlike a conductive additive in the form of particles such as acetylene black, which makes point contact with an active material, graphene is capable of surface contact with high contact possibility; accordingly, the electric conduction paths among the active material particles 103 and the graphene flakes 104 can be formed with a small amount of the conductive additive. Thus, the proportion of the active material particles 103 in the active material layer 102 can be increased. Accordingly, the discharge capacity of the storage battery can be increased.

For the active material particles 103, a material into and from which carrier ions such as lithium ions can be inserted and extracted is used. The average diameter or diameter distribution of the active material particles can be controlled by crushing, granulation, and classification by an appropriate means. Although the active material particles 103 are schematically illustrated as spheres in FIG. 1C, the shape of the active material particles 103 is not limited to this shape.

The average diameter of a primary particle of the active material particles 103 is less than or equal to 500 nm, preferably greater than or equal to 50 nm and less than or equal to 500 nm. To make surface contact with a plurality of the active material particles 103, the graphene flakes 104 preferably have sides the length of each of which is greater than or equal to 50 nm and less than or equal to 100 μm, preferably greater than or equal to 800 nm and less than or equal to 20 μm.

In the case where the active material particles 103 are positive electrode active material particles, a material into and from which lithium ions can be inserted and extracted can be used; for example, a material having an olivine crystal structure, a layered rock-salt crystal structure, a spinel crystal structure, or a NASICON crystal structure, or the like can be used.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used, for example.

Alternatively, an olivine-type lithium-containing complex phosphate which can be expressed by a general formula $LiMPO_4$ (M is one or more of Fe, Mn, Co, and Ni) can be used. Typical examples of $LiMPO_4$ are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<0<g<1, 0<h<1, and 0<i<1).

Alternatively, a lithium-containing transition metal silicate such as $Li_{(2-j)}MSiO_4$ (general formula) (M is one or more of Fe(II), Mn(II), Co(II), and Ni(II), 0≤j≤2) can be used. Typical examples of $Li_{(2-j)}MSiO_4$ (general formula) are lithium metal silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kMn_lSiO_4$ (k+l≤1, 0<k<1, and 0<l<1), $Li_{(2-j)}Fe_m$—$Ni_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula) (A=Li, Na, or Mg, M=Fe, Mn, Ti, V, Nb, or Al, X=S, P, Mo, W, As, or Si) can be used for the active material particles 103. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ or $FeF_3$, a metal chalcogenide (a sulfide, a selenide, or a telluride) such as $TiS_2$ or $MoS_2$, a material with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound in which lithium of the lithium compound, the lithium-containing complex phosphate, or the lithium-containing transition metal silicate is replaced by carrier ions of an alkali metal (e.g., sodium or potassium) or an alkaline-earth metal (e.g., calcium, strontium, barium, beryllium, or magnesium) may be used as the positive electrode active material.

The average diameter of the positive electrode active material is preferably, for example, more than or equal to 5 nm and less than or equal to 50 μm.

In the case where a negative electrode active material is used for the active material particles 103, for example, a carbon-based material, an alloy-based material, or the like can be used.

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal when lithium ions are inserted into graphite and a lithium-graphite intercalation compound is formed. For this reason, a lithium ion secondary battery can have a high operating voltage. In addition, graphite has advantages of relatively high capacity per unit volume, small change in volume due to charging and discharging, low cost, and safety greater than that of a lithium metal.

As the negative electrode active material, a material which enables charge-discharge reaction by alloying and dealloying reaction with a carrier ion can be used. For example, in the case where carrier ions are lithium ions, a material including at least one of Mg, Ca, Ga, Si, Al, Ge, Sn, Pb, Sb, Bi, Ag, Zn, Cd, As, Hg, In, and the like can be used. Such elements have higher capacity than carbon. In particular, silicon has a high theoretical capacity of 4200 mAh/g. For this reason, silicon is preferably used as the negative electrode active material. Examples of the material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as titanium dioxide ($TiO_2$), lithium titanium oxide ($Li_4Ti_5O_{12}$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride including lithium and a transition metal, can be used. For example, $Li_{2.6}Co_{0.4}N_3$ has high charge and discharge capacity (900 mAh/g and 1890 $mAh/cm^3$).

In the case of using a nitride including lithium and a transition metal, since lithium ions are included in the negative electrode active material, a material which does not include lithium ions, such as $V_2O_5$ or $Cr_3O_8$, can be used as a positive electrode active material. Note that even in the case of using a material including lithium ions as a positive electrode active material, the nitride including lithium and a transition metal can be used as the negative electrode active material by extracting lithium ions included in the positive electrode active material in advance.

Alternatively, a material which causes a conversion reaction can be used as the negative electrode active material; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $SiF_3$. Note that any of the fluorides can be used as a positive electrode active material because of its high potential.

In this embodiment, graphene is used as the conductive additive. Graphene is obtained by reduction of graphene oxide. Graphene oxide can be formed by any of a variety of synthesis methods such as a Hummers method, a modified Hummers method, or oxidation of a graphite material.

For example, in a Hummers method, graphite such as flake graphite is oxidized to give graphite oxide. The obtained graphite oxide is graphite which is oxidized partly and thus to which a functional group such as a carbonyl group, a carboxyl group, or a hydroxyl group is bonded. Accordingly, in the graphite oxide, the crystallinity of the graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm.

In a storage battery electrode of one embodiment of the present invention, this graphene is used as a conductive additive of the electrode. However, in the case of forming the storage battery electrode by mixing graphene or grapheme formed by reducing graphene oxide in advance (RGO is used as an abbreviation of reduced graphene oxide) with an active material and a binder, aggregation of the grapheme or RGO occurs in the electrode because of the low dispersion property of the graphene and RGO; therefore, it is difficult to achieve favorable battery characteristics.

While in the case of using graphene oxide as a raw material of a conductive additive of an electrode, a mixture formed by mixing the graphene oxide with an active material and a binder in a polar solvent is provided over a current collector, and after that, the graphene oxide is reduced by reduction treatment, so that graphene can be formed. When an electrode is formed using this method, a graphene network for electric conduction is formed in an active material layer including an active material and a binder. Thus, an electrode including a highly conductive active material layer where active material particles are electrically connected to each other by graphene can be formed.

Figure 2:
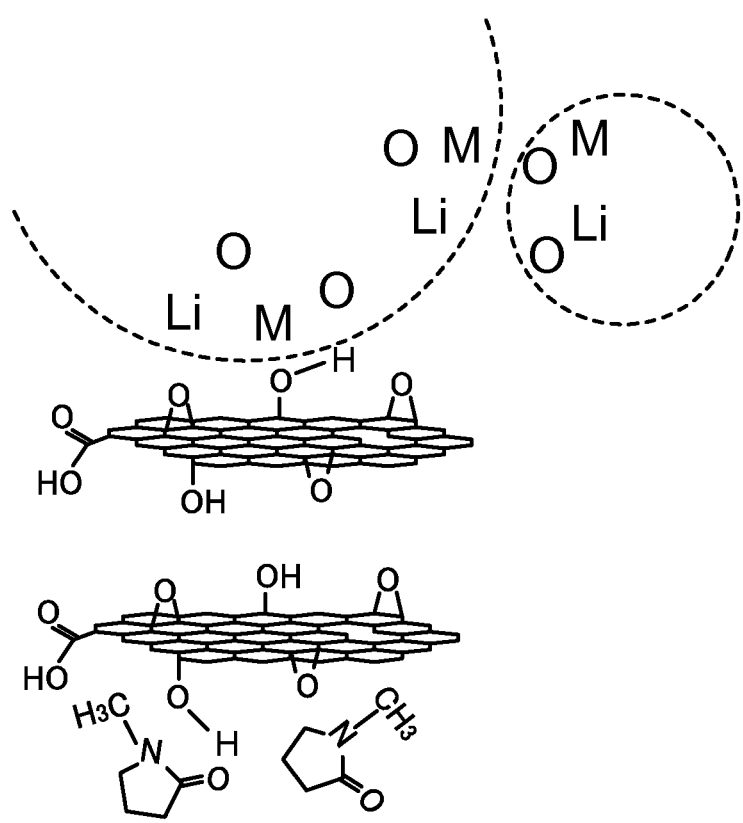
FIG. 2 illustrates intermolecular force of graphene oxide in one embodiment of the present invention.

This is because graphene oxide used as a raw material of graphene is a polar material having a functional group such as an epoxy group, a carbonyl group, a carboxyl group, or a hydroxyl group as illustrated in FIG. 2. Oxygen in the functional group in graphene oxide is negatively charged in a polar solvent; hence, graphene oxide flakes do not easily aggregate. Moreover, graphene oxide strongly interacts with the polar solvent and the active material used in mixing, and the functional group such as an epoxy group in the graphene oxide interacts with the polar solvent, which probably prevents aggregation among graphene oxide flakes, resulting in uniform dispersion of graphene oxide in the polar solvent. Furthermore, graphene oxide flakes are thin; thus, graphene oxide especially with strong intermolecular force easily bonds to active material particles including oxygen. In addition, since graphene oxide flakes do not easily bond to each other, aggregation of active material particles including oxygen tends to be suppressed.

When graphene oxide is used as a raw material of a conductive additive, graphene oxide does not function as a conductive additive as it is because graphene oxide has high dispersibility in the polar solvent but has low conductivity. However, because graphene oxide has a stable skeleton derived from graphene, graphene oxide can easily gain conductivity by reduction treatment.

Examples of a method for reducing graphene oxide include reduction treatment with heating (thermal reduction), electrochemical reduction treatment performed by applying a potential at which graphene oxide is reduced to an electrode in an electrolytic solution (electrochemical reduction), and reduction treatment using a reducing agent (chemical reduction).

In the case of performing thermal reduction, attention has to be paid so that decomposition or a change in quality of other materials is not caused.

In the case of performing electrochemical reduction, attention has to be paid so as to sufficiently apply voltage evenly to a storage battery electrode under the condition where an electrolytic solution does not dissolve materials of the electrode.

In the case of performing chemical reduction, attention has to be paid so that dissolution or a change in quality of an active material or a current collector is not caused by a reducing agent or a reducing solution.

These methods for reducing graphene oxide are described in detail later.

Using the above-described materials, an electrode is formed.

First, graphene oxide and active material particles are mixed, and a polar solvent such as 1-methyl-2-pyrrolidone (NMP) or dimethylformamide (DMF) is added thereto and mixed to prepare a paste mixture. In particular, when a material including oxygen is used as the active material particles 103, mixing under the state where the active material particles and graphene oxide are dispersed uniformly and the state where the secondary particle diameter is small, that is, under the disaggregated state, is possible. Here, "paste" is used to refer to the viscosity at which free flowing does not occur in the stationary state.

The paste mixture is kneaded. Here, "kneading" refers to mixing with high viscosity. In kneading, high shearing force is generated and thereby dispersion of an active material or graphene oxide or separation of graphene oxide easily occurs. As a kneading means, an apparatus such as a planetary mixer or a kneader can be used.

Then, a solvent and a binder are added to the kneaded paste mixture to adjust the viscosity to give a slurry mixture. Here, "slurry" is used to refer to the viscosity at which fluidity is maintained even in the stationary state. As a mixing means of the slurry mixture, any of various kinds of mixers such as a stirring and defoaming machine and a dissolver can be used.

Here, a polymer having a poly(vinylidene fluoride) structure is used as the binder. Examples of the polymer having a poly(vinylidene fluoride) structure include poly(vinylidene fluoride) (PVdF) and a copolymer including PVdF (e.g., a copolymer of PVdF and polytetrafluoroethylene (PTFE)). Once PVdF reacts with a base, a chain reaction of eliminating hydrogen fluoride proceeds. This chain reaction can be suppressed when using the copolymer.

Note that a different apparatus may be used depending on the viscosity, or only the viscosity may be gradually changed with a planetary centrifugal mixer in mixing. Moreover, if stirring is performed at high speed, sufficient shearing force can be generated from the low viscosity; thus, uniform mixing is possible by starting the mixing from the slurry state without passing through the mixing in the paste state.

The slurry mixture is applied to one or both surfaces of the current collector. For the application, a slot die method, a gravure method, a blade method, or a combination of any of them can be used, for example.

Next, the solvent is volatilized by a method such as ventilation drying or reduced pressure drying, whereby an electrode including the active material layer 102 and the current collector 101 is formed. The ventilation drying can be performed with a hot wind with temperatures of higher than or equal to 50° C. and lower than or equal to 180° C. Through this step, the polar solvent included in the active material layer 102 is volatilized.

Here, the amount of graphene oxide is set to higher than or equal to 0.1 wt % and lower than or equal to 10 wt %, preferably higher than or equal to 0.1 wt % and lower than or equal to 5 wt %, further preferably higher than or equal to 0.2 wt % and lower than or equal to 2 wt %, still further preferably higher than or equal to 0.2 wt % and lower than or equal to 1 wt % with respect to the total weight of the mixture of the graphene oxide, the active material, the conductive additive, and the binder. Furthermore, in the active material layer, graphene is included at higher than or equal to 0.05 wt % and lower than or equal to 5 wt %, preferably higher than or equal to 0.05 wt % and lower than or equal to 2.5 wt %, further preferably higher than or equal to 0.1 wt % and lower than or equal to 1 wt %, still further preferably higher than or equal to 0.1 wt % and lower than or equal to 0.5 wt % with respect to the total weight of the active material layer. This is because the weight of graphene is reduced by almost half due to the reduction of the graphene oxide. The binder is included at higher than or equal to 0.5 wt % and lower than or equal to 20 wt %, preferably higher than or equal 1 wt % and lower than or equal to 10 wt %.

The active material layer 102 is pressed by a compression method such as a roll press method or a flat plate press method so as to have high density.

Next, reaction is caused in a solution including a reducing agent (also referred to as a reducing solution). By this reaction, graphene oxide included in the active material layer is reduced to form graphene. Note that oxygen in graphene oxide is not necessarily entirely eliminated and may partly remain in graphene. When graphene includes oxygen, the ratio of oxygen measured by XPS in graphene is higher than or equal to 2 atomic % and lower than or equal to 20 atomic %, preferably higher than or equal to 3 atomic % and lower than or equal to 15 atomic %. This reduction treatment is preferably performed at higher than or equal to room temperature and lower than or equal to 150° C.

As a solute, a material having a LUMO level of higher than or equal to $-5.0$ eV and lower than or equal to $-3.8$ eV, or a reducing agent having a reduction potential of higher than or equal to $-1.3$ V and lower than or equal to $+0.8$ V (vs. SCE), preferably higher than or equal to $-0.4$ V and lower than or equal to $-0.8$ V (vs. SCE) can be used. Examples of the reducing agent are ascorbic acid, hydrazine, dimethyl hydrazine, hydroquinone, sodium boron hydride ($NaBH_4$), tetra butyl ammonium bromide (TBAB), N,N-diethylhydroxylamine, and a derivative thereof. Particularly when a reducing agent with a low reducing ability is used, the influence on the active material can be suppressed. In addition, decomposition due to the reaction with the solvent or moisture in the atmospheric air is less likely to occur, so that the selection of the environment for the reduction treatment and the solvent becomes less limited.

A polar solvent can be used as the solvent. Any material can be used for the polar solvent as long as it can dissolve the reducing agent. Examples of the material of the polar solvent are water, methanol, ethanol, acetone, tetrahydrofuran (THF), DMF, NMP, dimethyl sulfoxide (DMSO), and a mixed solution of any two or more of the above. In particular, water is highly advantageous industrially. In addition, water can shorten the reaction time.

The above-described reducing solution including the solvent and the solute is preferably substantially neutral or weakly basic. In other words, the acid dissociation constant pKa and the base dissociation constant pKb of the reducing solution preferably have the following relation: pKb<pKa+4. This facilitates the modification of the poly(vinylidene fluoride) structure in the polymer. Moreover, the relation pKb>pKa−4 is preferable because excessive modification of the poly(vinylidene fluoride) structure can be easily suppressed. Further preferably, the relation pKa−2<pKb<pKa+2 is satisfied, in which case the modification of the polymer can be easily controlled. In the case where the reducing solution is an aqueous solution, an aqueous solution having pH of more than 4 and less than 10, preferably more than 5 and less than 9, further preferably more than 6 and less than 8, is used. An alkali reagent may be added to the reducing solution.

Then, the electrode is cleaned. As the cleaning liquid, the solvent of the reducing solution can be used. The remaining reducing agent can be removed by the cleaning. In addition, the elimination reaction in RGO can be promoted by the cleaning. Furthermore, the modification of the polymer can be caused in this cleaning step as well as in the reduction treatment step. It can be considered that the promotion of the elimination reaction in RGO is caused by elimination of the reducing agent or a proton that is added and not eliminated. Thus, a slight amount of reagent that facilitates elimination of a proton may be added. Since a certain amount of reducing solution remains on the electrode normally, the used cleaning liquid includes the reducing agent at a concentration lower than that of the reducing solution used in the reduction treatment. By repeating the cleaning a plurality of times, the concentration of the reducing agent included in the used cleaning liquid and on the electrode is lowered. By adding a base into the cleaning liquid, the modification of the polymer can be promoted. In particular, cleaning is preferably performed with pure water because the elimination reaction in RGO and the modification reaction of the polymer are easily promoted and an industrially big advantage can be gained.

Figure 3:
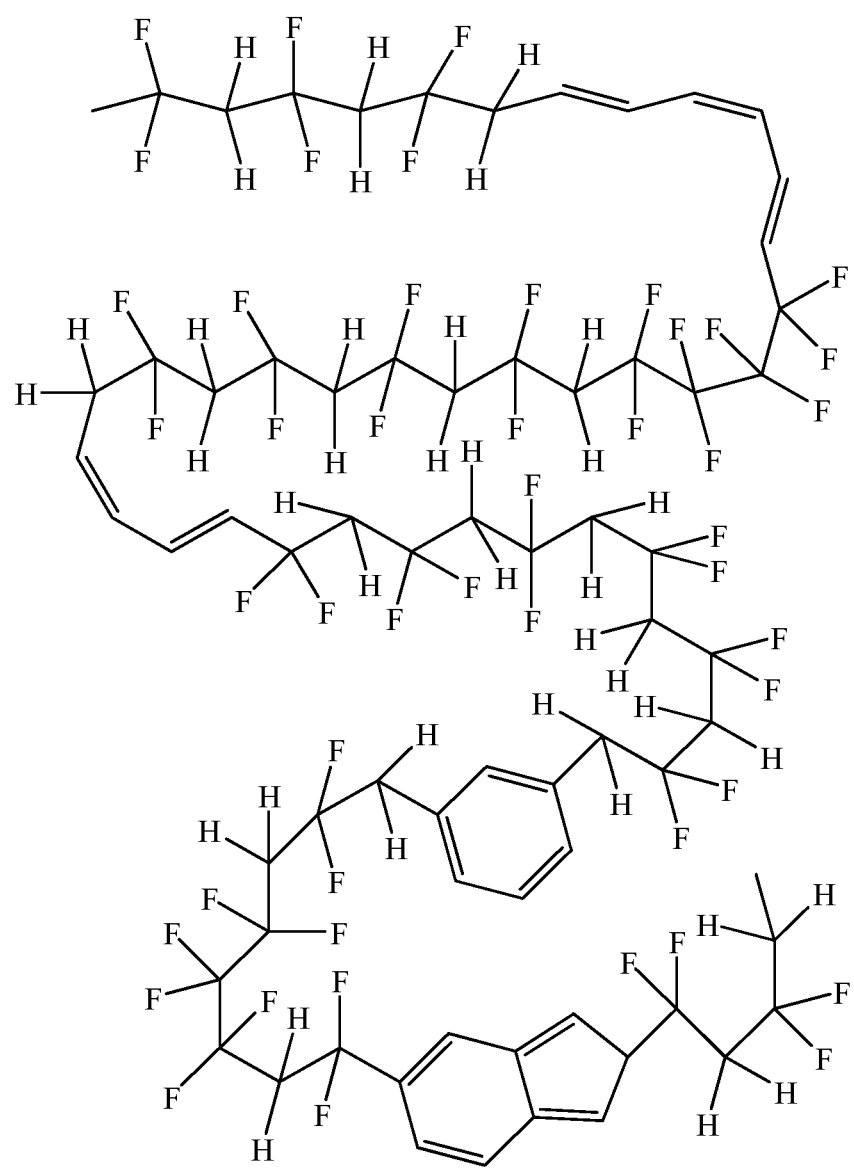
FIG. 3 illustrates a modified polymer in one embodiment of the present invention.

This modification reaction of the polymer is typically elimination of hydrogen fluoride, and the polymer having a poly(vinylidene fluoride) structure is modified into a polymer which has a poly(vinylidene fluoride) structure and partly has a polyene structure or an aromatic ring structure, which is a cyclized structure. In other words, a poly(vinylidene fluoride) is modified into a partly dehydrofluorinated poly(vinylidene fluoride) which has a polyene structure or an aromatic ring structure in its main chain. A molecular structure example of the modified polymer is illustrated in FIG. 3. The formed polyene structure or the aromatic ring structure, which is a cyclized structure, is sandwiched between the unmodified poly(vinylidene fluoride) structures. Note that the polyene structure herein refers to a partial structure represented by $(CH)_n$ (n>3). The aromatic ring structure is an aryl group including a polycyclic aromatic hydrocarbon group, and includes a phenyl group, a biphenyl group, or a naphthyl group. The poly(vinylidene fluoride) structure is a partial structure represented by $(CF_2CH_2)_n$. Although more than one hundred monomers are included in the polymer, the same monomer structure does not necessarily continue in the case where the polymer is a random copolymer. Furthermore, the modification rate, that is, the sum of the formed aromatic ring structures and the formed polyene structures is less than 5% in carbon atomic ratio with respect to the poly(vinylidene fluoride) structures.

Then, the cleaned electrode is heated. The heating of the electrode is preferably performed under reduced pressure. This heating step is preferably performed at, for example, a temperature of higher than or equal to 50° C. and lower than or equal to 200° C. in vacuum for more than or equal to 1 hour and less than or equal to 48 hours. By this heating, the polar solvent or moisture existing in the active material layer 102 can be removed. Furthermore, reduction of RGO can be promoted. Through this process, another thermal condensation process, or the like, the electrode strength can be improved.

The obtained electrode is pressed by a compression method such as a roll press method or a flat plate press method so as to have high density. The pressing may be performed either or both of before and after the reduction treatment. The obtained electrode is shaped to a predetermined size, and a storage battery electrode is formed. Since the entry of moisture into the storage battery is particularly a significant problem, it is preferable to press the storage battery while moisture is removed in a reduced-pressure atmosphere. However, in terms of processing, it is preferable to press the storage battery in an air atmosphere. Thus, after the reduction treatment, the electrode is heated under a reduced pressure, pressed in an air atmosphere, and then shaped to a predetermined size. In addition, the obtained electrode is preferably further heated under a reduced pressure so that moisture can be sufficiently removed.

Since the bonding between the modified polymer and RGO is improved, the electrode strength can be improved. In addition, since RGO is evenly dispersed in the electrode together with the active material particles, a voltage can be applied evenly to the entire electrode. This suppresses polarization of part of the active material particles in the electrode, so that a capacity is increased. Furthermore, since the preferential battery reaction in part of the particles is suppressed, cycle performance is increased. Moreover, since the active material particles are favorably bonded to each other with the binder and RGO, for example, even when interface resistance of the active material is increased owing to the decomposition of the electrolytic solution, the influence is little. This means a high ability of suppressing the change in internal resistance of the battery, leading to improvements in cycle performance and storage characteristics.

Through the above-described steps, the storage battery electrode 100 which includes the polymer having the modified poly(vinylidene fluoride) structure, graphene, and the active material particles can be formed.

One embodiment of the present invention can be used for various power storage devices. Examples of the power storage devices include a battery, a primary battery, a secondary battery, a lithium-ion secondary battery (including a lithium-ion polymer secondary battery), and a lithium air battery. The examples of the power storage devices also include a capacitor.

This embodiment can be implemented in combination with any of the other embodiments as appropriate.

Embodiment 2

In this embodiment, a method for forming a storage battery electrode with improved interface bonding strength between an active material layer and a current collector will be described in detail.

First, a slurry mixture which includes active material particles, a polymer having a poly(vinylidene fluoride) structure, and a conductive additive is prepared. Here, the conductive additive is not particularly limited, and carbon black, especially carbon black having a higher order structure such as acetylene black or Ketjen Black (registered trademark), can be used. Alternatively, the above-described graphene or the like can be used.

A metal foil covered with a layer substantially formed of carbon particles is used as the current collector. The kind of the metal foil is as described in Embodiment 1, and a feature of this embodiment is that the metal foil is covered with a layer substantially formed of carbon particles. The layer substantially formed of carbon particles does not necessarily cover the entire current collector, and rather tends to be in an island shape covering part of the current collector, in which case part of the current collector metal is exposed. The layer substantially formed of carbon particles may include carbon particles with almost the same size as that of graphite or may include only carbon black having less than or equal to the submicron size. The layer substantially formed of carbon particles can be formed by preparing a dispersion liquid in which carbon particles are dispersed in a solvent and coating the current collector with the dispersion liquid. The dispersion liquid in which carbon particles are dispersed includes an organic polymer at 1 wt % or lower or does not include an organic polymer at all. As the dispersion liquid in which carbon particles are dispersed, an aqueous solution in which carbon black is dispersed can be used. As a dispersion means, a method for adding a base such as ammonia is known, for example. As the carbon particles, carbon black is preferably used. The layer formed of carbon particles preferably has a thickness of 2 µm or less.

To the current collector covered with the layer substantially formed of carbon particles, the slurry mixture including the active material particles is applied to form an active material layer. As for the application means and the heating means for volatilizing the solvent, any of the methods described in Embodiment 1 can be employed.

The obtained electrode is immersed in the polar solvent, so that the polymer having a poly(vinylidene fluoride) structure in the active material layer can be modified. This modification is typically elimination of hydrogen fluoride, and the polymer having a poly(vinylidene fluoride) structure is modified into a polymer which has a poly(vinylidene fluoride) structure and partly has a polyene structure or an aromatic ring structure, which is a cyclized structure. In the case of using a slurry mixture including graphene oxide in order to use graphene as the conductive additive, the reduction step of graphene oxide and the modification step of the poly(vinylidene fluoride) structure can be performed in one step. As the polar solvent, water or alcohols such as ethanol can be used. The liquid in which the electrode is immersed may include a pH adjuster. In this case, however, the pH need not necessarily be changed. This is because the hydrofluoric acid eliminated by modification is an acid. In the case of modifying the polymer in parallel with another treatment, the pH (or pKa) may be changed in accordance with the another treatment. The modification of the polymer proceeds more when the liquid in which the electrode is immersed is basic, but can be performed depending on the time and temperature even when the liquid in which the electrode is immersed is neutral or weakly acidic. However, if the modification of the polymer proceeds excessively, gelling of the polymer or a reduction of the binder ability are caused; accordingly, it is preferable that only part of the polymer be modified. In this case, the formed polyene structure or the aromatic ring structure, which is a cyclized structure, is sandwiched between the unmodified poly(vinylidene fluoride) structures. As described above, the polyene structure herein refers to a partial structure represented by $(CH)_n$ (n>3). The aromatic ring structure is an aryl group including a polycyclic aromatic hydrocarbon group, and includes a phenyl group, a biphenyl group, or a naphthyl group. The poly(vinylidene fluoride) structure is a partial structure represented by $(CF_2CH_2)_n$. Although more than one hundred monomers are included in the polymer, the same monomer structure does not necessarily continue in the case where the polymer is a random copolymer.

After the modification treatment, the electrode is heated to volatilize the included solvent. Cleaning may be performed after the modification treatment, as appropriate. The heating may be performed under an atmospheric pressure or a reduced pressure. The heating under an atmospheric pressure and the heating under a reduced pressure may be performed at different temperatures in combination.

The obtained electrode may be pressed by a compression method such as a roll press method or a flat plate press method so as to have high density. The pressing may be performed either or both of before and after the modification treatment. Since the entry of moisture into the storage battery is particularly a significant problem, it is preferable to press the storage battery while moisture is removed in a reduced-pressure atmosphere. However, in terms of processing, it is preferable to press the storage battery in an air atmosphere. Thus, it is preferable that after the modification treatment, the electrode be heated and pressed and that water and the solvent be elaborately volatilized.

Lastly, the electrode is shaped to a predetermined size, and a storage battery electrode is formed.

In the vicinity of the interface of the current collector, the layer substantially formed of carbon particles (also referred to as a "covering layer") is sandwiched between the metal foil and the active material layer. An oxide layer is sometimes formed on the surface of the metal foil, and the oxide layer generates interface resistance. By forming the covering layer on the surface of the metal foil, the surface of the metal foil in contact with the covering layer is reduced, so that formation of the oxide layer is suppressed and the interface resistance is hardly generated.

The materials which are used as carbon particles included in the covering layer include few materials that generate favorable intermolecular force. Thus, for example, by mixing a polymer into the covering layer, the application conditions of a mixed liquid for forming the covering layer are improved. Furthermore, the interface strength of the electrode can be improved. However, in the case of using this embodiment, a structure having the same conjugated $\pi$ bond as the carbon particles included in the covering layer is formed in the polymer included in the active material layer, so that the bonding strength between the active material layer and the covering layer is improved. Furthermore, since the covering layer and the metal foil are both conductors, the intermolecular force is relatively favorable. For the above-described reasons, in this embodiment, an electrode with improved interface strength can be obtained without mixing a polymer into the covering layer.

Compared with the case where the current collector in which a metal foil is covered with the covering layer into which a polymer is mixed is used and the polymer modification treatment is not performed, this embodiment can improve the bonding strength at the interface between the metal foil and the covering layer and provide an electrode in which separation in the electrode is not easily caused.

This can be explained as follows. In the case of using a covering layer in which carbon particles and a polymer are mixed, the intermolecular force between the polymer in the covering layer and the polymer having a poly(vinylidene fluoride) structure in the active material layer is large, and thus the interface strength between the covering layer and the active material layer is higher than that of this embodiment. However, the bonding strength between the covering layer and the metal foil is weaker than that of this embodiment because it depends mainly on the bonding strength between the oxide layer and the polymer. In other words, the difference between the bonding strength between the covering layer and the metal foil and the bonding strength between the covering layer and the active material layer appears more significant than that of this embodiment. Therefore, when force that causes separation between the current collector and the active material layer is applied to the electrode, the separation force is concentrated between the covering layer and the active material layer.

As compared to the above-mentioned case, this embodiment can improve the electrode strength. Note that although the intermolecular force working between the carbon particles included in the covering layer and the polymer included in the active material layer is described as the factor for increasing the bonding strength between the covering layer and the active material layer in the above consideration, bonding can be considered as the factor, in which case the factor is polymerization between the carbon particles included in the covering layer and the modified polymer included in the active material layer.

Through the above-described steps, a storage battery electrode which includes a metal foil, a layer substantially formed of carbon particles (covering layer), and an active material layer including the polymer having the modified poly(vinylidene fluoride) structure can be formed.

This embodiment can be implemented in combination with any of the other embodiments as appropriate.

Embodiment 3

In this embodiment, another method for forming the storage battery electrode described in Embodiment 1 will be described in detail.

First, graphene oxide, active material particles, and a polar solvent are mixed to prepare a paste mixture. Then, the paste mixture is kneaded (mixing at high viscosity). Since mixing at high viscosity tends to generate high shearing force, separation of graphene oxide and uniform dispersion of graphene oxide and the active material particles can be achieved. In particular, when a material including oxygen is used as the active material particles 103, mixing under the state where the active material particles and graphene oxide are dispersed uniformly and the state where the secondary particle diameter is small, that is, under the disaggregated state, is possible.

The paste mixture is kneaded. Here, "kneading" refers to mixing with high viscosity. In kneading, high shearing force is generated and thereby dispersion of an active material or graphene oxide or separation of graphene oxide easily occurs. As a kneading means, an apparatus such as a planetary mixer or a kneader can be used.

A solvent may be further added into the dispersion mixture. In general, a lower concentration causes less reaggregation, leading to a smaller secondary particle diameter.

Next, reaction of the obtained mixture is caused in a solution including a reducing agent. By this reaction, graphene oxide included in the mixture is reduced to form graphene. Note that oxygen in graphene oxide is not necessarily entirely eliminated and may partly remain in graphene. When graphene includes oxygen, the ratio of oxygen measured by XPS in graphene is higher than or equal to 1 atomic % and lower than or equal to 20 atomic %, preferably higher than or equal to 2 atomic % and lower than or equal to 15 atomic %. This reduction treatment is preferably performed at higher than or equal to room temperature and lower than or equal to 150° C. This reduction may be performed after the mixture is heated, or a reducing solution may be added to a slurry or paste mixture. In the case where the reduction is performed after the mixture is heated, the heating step causes aggregation, but then aggregated particles which are extremely small (disaggregated) active material secondary particles to which graphene oxide is attached are formed. By selecting the mixing conditions, for example, primary particles each of which has a diameter of 100 nm or less and to each of which graphene oxide is attached can be obtained. Thus, the aggregated particles obtained by heating can be primary particles each of which is in contact with graphene oxide. These aggregated particles have a conduction path that enables a very efficient battery reaction and can produce favorable battery characteristics. The degree of difficulty of applying particles depends on the diameter of secondary particles, and application of submicron microparticles is difficult. By using aggregated particles, such a difficulty can be eliminated. By this treatment, graphene oxide becomes RGO.

As a solute, a material having a LUMO level of higher than or equal to −5.0 eV and lower than or equal to −3.8 eV, or a reducing agent having a reduction potential of higher than or equal to −1.3 V and lower than or equal to +0.8 V (vs. SCE), preferably higher than or equal to −0.4 V and lower than or equal to +0.8 V (vs. SCE) can be used. Examples of the reducing agent are ascorbic acid, hydrazine, dimethyl hydrazine, hydroquinone, sodium boron hydride ($NaBH_4$), tetra butyl ammonium bromide (TBAB), N,N-diethylhydroxylamine, and a derivative thereof. Particularly when a reducing agent with a low reducing ability is used, the influence on the active material can be suppressed. In addition, decomposition due to the reaction with the solvent or moisture in the atmospheric air is less likely to occur, so that the selection of the environment for the reduction treatment and the solvent becomes less limited.

A polar solvent can be used as the solvent. Any material can be used for the polar solvent as long as it can dissolve the reducing agent. Examples of the material of the polar solvent are water, methanol, ethanol, acetone, THF, DMF, NMP, DMSO, and a mixed solution of any two or more of the above. In particular, water is highly advantageous industrially. In addition, water can shorten the reaction time.

Then, the obtained particles are collected. At the same time, cleaning may be performed. As the cleaning liquid, the solvent of the reducing solution can be used. The remaining reducing agent can be removed by the cleaning. In addition, the elimination reaction in RGO can be promoted by the cleaning. In particular cleaning is preferably performed with pure water because the elimination reaction in RGO is easily promoted and an industrially big advantage can be gained. For the collection, centrifugation, filtration, or the like can be employed.

The collected particles are heated, so that the remaining solvent is removed. The heating may also serve as thermal reduction of RGO; in this case, the heating can be rephrased as heat treatment. The heat treatment can be performed in a vacuum atmosphere, an air atmosphere, or an inert atmosphere. An evaporator or the like may also be used. A plurality of heating conditions may be combined. The heat treatment can be performed at temperatures ranging from room temperature to approximately 800° C. Much higher temperatures are preferable because oxygen in RGO is further eliminated and electric conductivity is improved, and the heat treatment can be performed in a temperature range that does not cause decomposition of the active material.

A binder and a solvent are added to the obtained mixed particles of the active material and RGO to adjust the viscosity to give a slurry mixture. As a mixing means of the slurry mixture, any of various kinds of mixers such as a stirring and defoaming machine and a dissolver can be used.

Here, a polymer having a poly(vinylidene fluoride) structure is used as the binder. Examples of the polymer having a poly(vinylidene fluoride) structure include PVdF and a copolymer including PVdF (e.g., a copolymer of PVdF and PTFE). Once PVdF reacts with a base, a chain reaction of eliminating hydrogen fluoride proceeds. This chain reaction can be suppressed by using a copolymer.

Moisture is added to the slurry mixture. This treatment causes modification of the poly(vinylidene fluoride) structure, that is, elimination of hydrogen fluoride. In other words, part of the poly(vinylidene fluoride) structure becomes a polyene structure or an aromatic ring structure through cyclization. As the moisture, moisture included in the solvent used for slurry formation moisture in the working atmosphere in or after the mixing may be utilized, instead of further adding moisture for this treatment. If the modification of PVdF proceeds excessively, gelling of the polymer or a reduction of the binder function are caused; accordingly, it is preferable that only part of the PVdF be modified. In other words, it is preferable that modification occurs in only part of a sequence of poly(vinylidene fluoride) structure. In this case, the formed polyene structure or the aromatic ring structure is sandwiched between the poly(vinylidene fluoride) structures.

After the binder is fully modified, the slurry mixture is applied to one or both surfaces of the current collector. For the application, a slot die method, a gravure method, a blade method, or a combination of any of them can be used, for example.

Next, the solvent included in the mixture is volatilized by a method such as ventilation drying or reduced pressure drying, whereby an electrode including the active material layer 102 and the current collector is formed. The ventilation drying can be performed with a hot wind with temperatures of higher than or equal to 50° C. and lower than or equal to 180° C. Through this step, the polar solvent included in the active material layer 102 is volatilized.

Note that the amount of graphene oxide that is a raw material is preferably set to higher than or equal to 0.1 wt % and lower than or equal to 10 wt %, preferably higher than or equal to 0.1 wt % and lower than or equal to 5 wt %, further preferably higher than or equal to 0.2 wt % and lower than or equal to 2 wt %, still further preferably higher than or equal to 0.2 wt % and lower than or equal to 1 wt % with respect to the total weight of the mixture of the graphene oxide, the positive electrode active material, the conductive additive, and the binder. Furthermore, in the electrode, graphene is included at higher than or equal to 0.05 wt % and lower than or equal to 5 wt %, preferably higher than or equal to 0.05 wt % and lower than or equal to 2.5 wt %, further preferably higher than or equal to 0.1 wt % and lower than or equal to 1 wt %, still further preferably higher than or equal to 0.1 wt % and lower than or equal to 0.5 wt % with respect to the total weight of the active material layer. This is because the weight of graphene is reduced by almost half due to the reduction of the graphene oxide. The binder is included at higher than or equal to 0.5 wt % and lower than or equal to 20 wt %, preferably higher than or equal to 1 wt % and lower than or equal to 10 wt %.

The active material layer is preferably pressed by a compression method such as a roll press method or a flat plate press method so as to have high density.

Through the above-described steps, the storage battery electrode 100 which includes the polymer having the modified poly(vinylidene fluoride) structure, graphene, and the active material particles can be formed.

This embodiment can be implemented in combination with any of the other embodiments as appropriate.

Embodiment 4

In this embodiment, the structure of a storage battery including a storage battery electrode formed by the formation method described in Embodiment 1 will be described with reference to FIGS. 4A and 4B, FIG. 5, FIGS. 6A and 6B, and FIGS. 7A and 7B.

(Coin-Type Storage Battery)

Figure 4A:
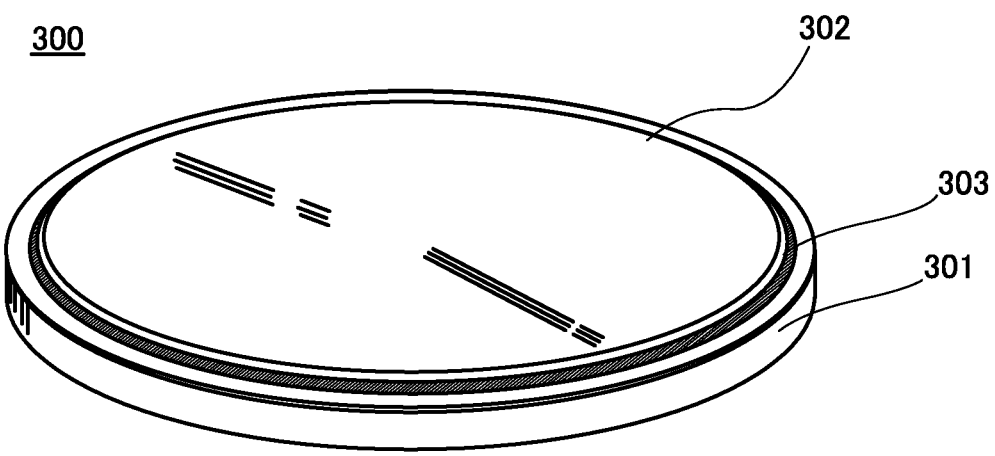
FIGS. 4A and 4B illustrate a coin-type storage battery.
Figure 4B:
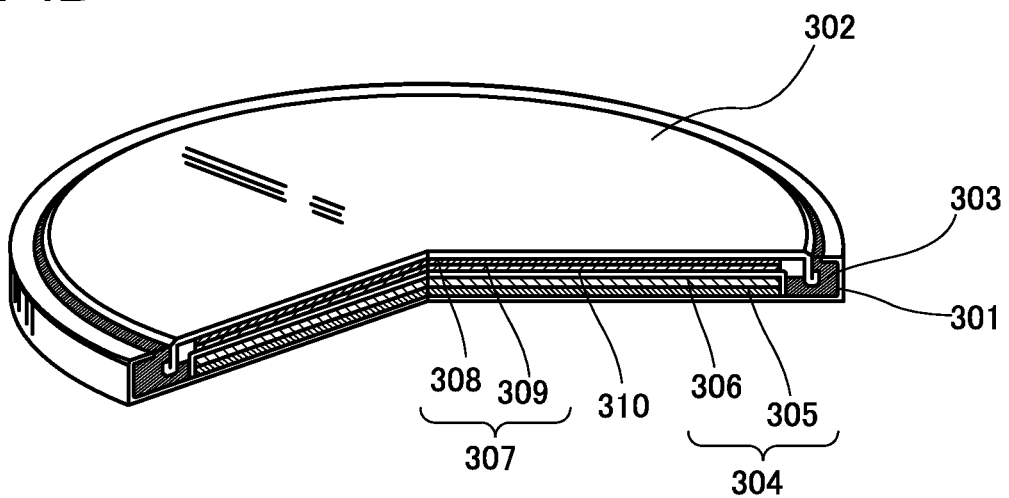

FIG. 4A is an external view of a coin-type (single-layer flat type) storage battery, and FIG. 4B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308. A separator 310 and an electrolytic solution (not illustrated) are provided between the positive electrode active material layer 306 and the negative electrode active material layer 309.

As the positive electrode 304 and the negative electrode 307, storage battery electrodes formed by the method for forming a storage battery electrode of one embodiment of the present invention, which is described in Embodiment 1, can be used.

As the separator 310, an insulator including pores, such as cellulose (paper), polyethylene, or polypropylene can be used.

As an electrolyte, a solid electrolyte, an electrolytic solution containing a supporting electrolyte, or a gel electrolyte obtained by gelation of part of an electrolytic solution can be used.

As a supporting electrolyte, a material which contains carrier ions can be used. Typical examples of the supporting electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions or alkaline-earth metal ions, instead of lithium in the above lithium salts, an alkali metal (e.g., sodium or potassium), an alkaline-earth metal (e.g., calcium, strontium, barium, beryllium, or magnesium) may be used for the electrolyte.

As a solvent of the electrolytic solution, a material in which carrier ions can move can be used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, THF, and the like, and one or more of these materials can be used. When a gelled high-molecular material is used as the solvent of the electrolytic solution, safety against liquid leakage and the like is improved. Further, the storage battery can be thinner and more lightweight. Typical examples of gelled high-molecular materials include a silicone gel, an acrylic gel, an acrylonitrile gel, polyethylene oxide-based gel, polypropylene oxide-based gel, a fluorine-based polymer gel, and the like. Alternatively, the use of one or more of ionic liquids (particularly, room temperature molten salts) which have features of non-flammability and non-volatility as a solvent of the electrolytic solution can prevent the storage battery from exploding or catching fire even when the storage battery internally shorts out or the internal temperature increases owing to overcharging or the like. An ionic liquid contains a cation and an anion. Examples of an organic cation included in an ionic liquid include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

The negative electrode 307, the positive electrode 304, and the separator 310 are immersed in the electrolyte. Then, as illustrated in FIG. 4B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

(Laminated Storage Battery)

Figure 5:
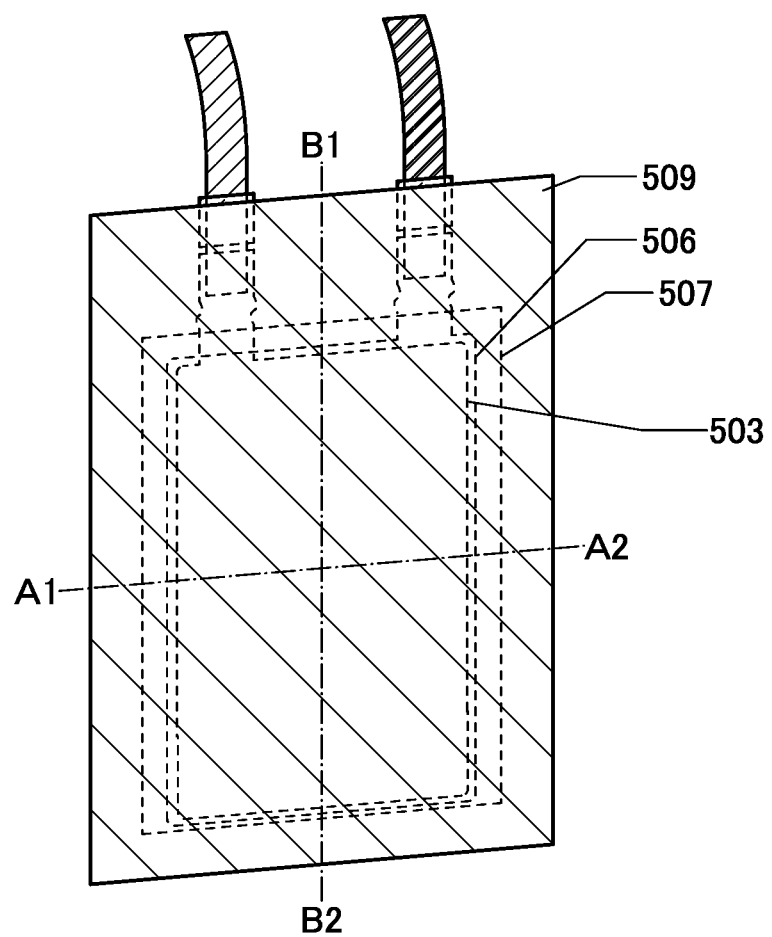
FIG. 5 illustrates a laminated storage battery.
Figure 6A:
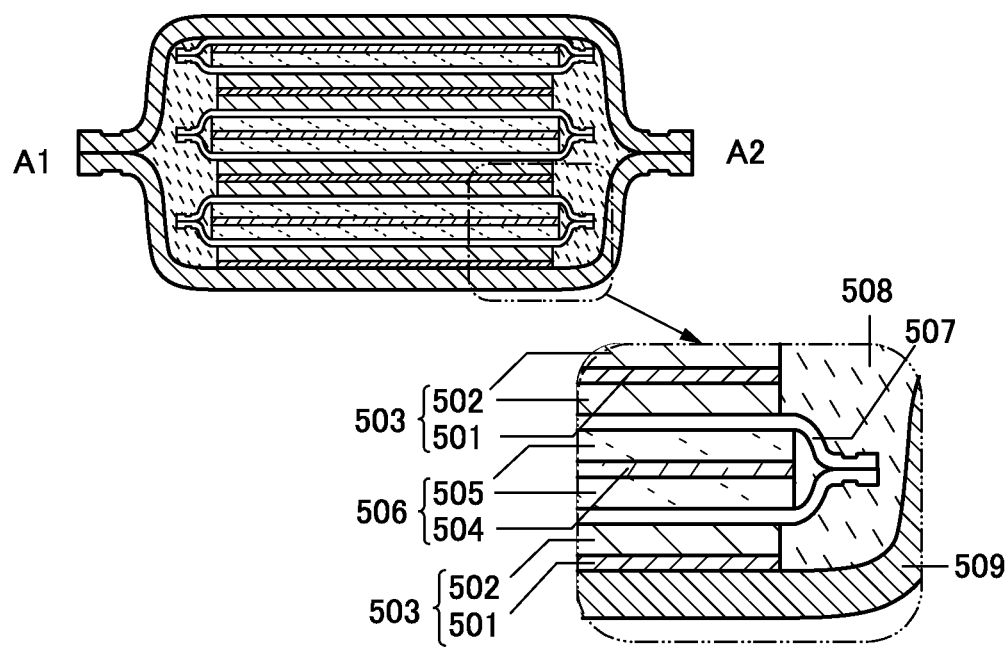
FIGS. 6A and 6B illustrate the laminated storage battery.
Figure 6B:
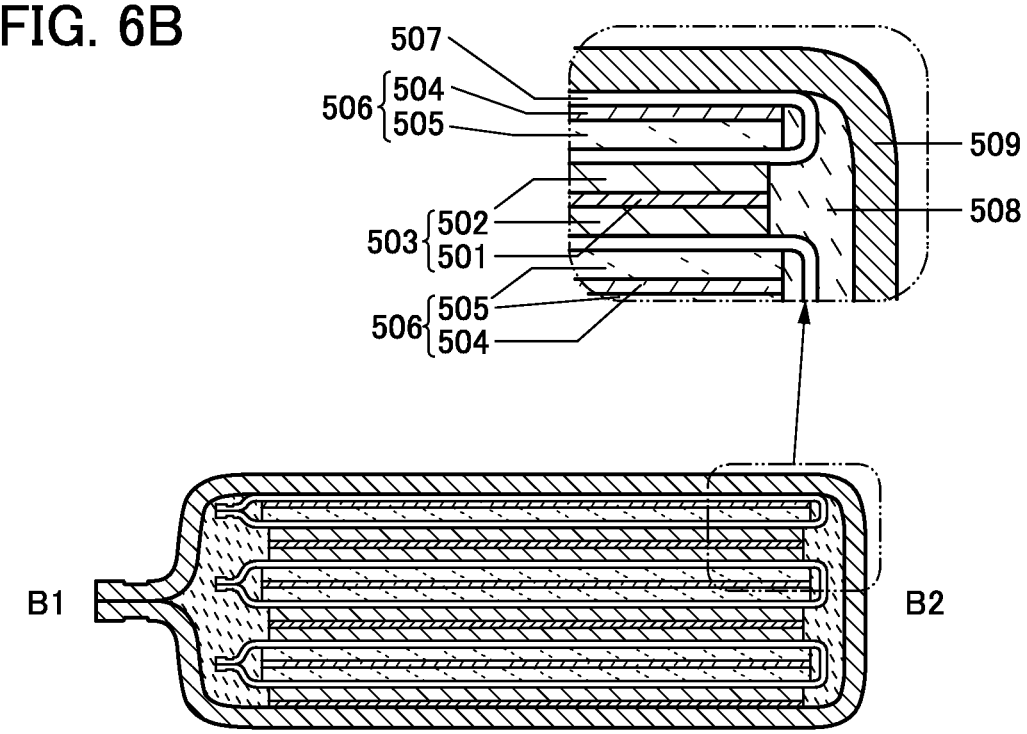

FIG. 5 is an external view of a laminated storage battery 500. FIGS. 6A and 6B are cross-sectional views along dashed-dotted lines A1-A2 and B1-B2, respectively, in FIG. 5. The laminated storage battery 500 is formed with a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is provided in the region surrounded by the exterior body 509.

In the laminated storage battery 500 illustrated in FIG. 5, the positive electrode current collector 501 and the negative electrode current collector 504 also function as terminals for electrical contact with an external portion. For this reason, each of the positive electrode current collector 501 and the negative electrode current collector 504 is provided so as to be partly exposed to the outside of the exterior body 509.

As the exterior body 509 in the laminated storage battery 500, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

(Cylindrical Storage Battery)

Figure 7A:
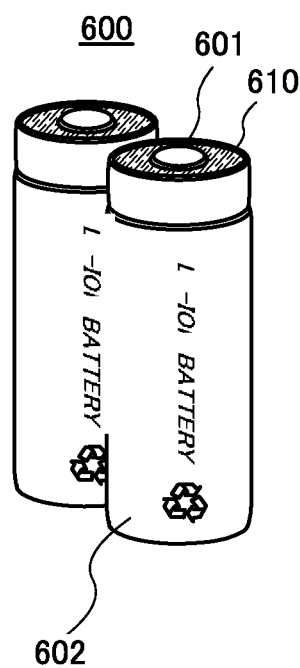
FIGS. 7A and 7B illustrate a cylindrical storage battery.

Next, an example of a cylindrical storage battery will be described with reference to FIGS. 7A and 7B. As illustrated in FIG. 7A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 7B:
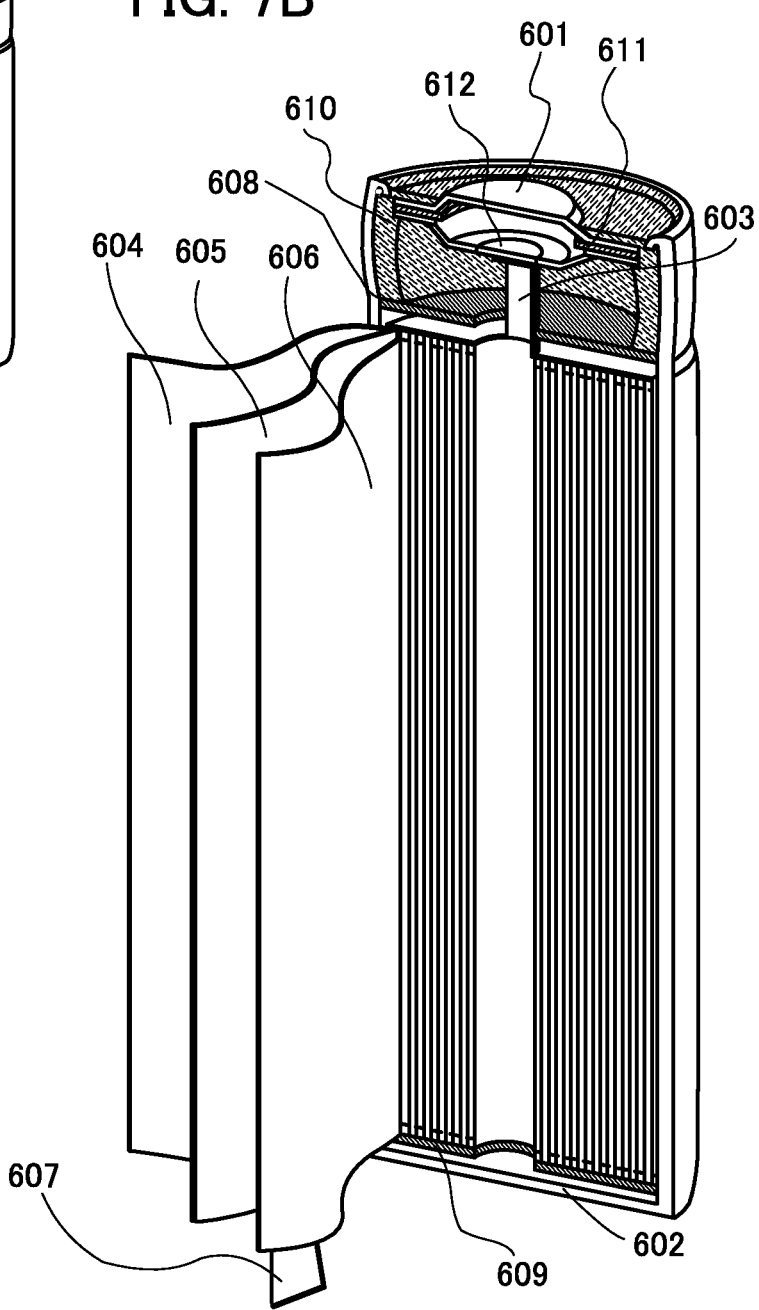

FIG. 7B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is closed and the other end thereof is open. For the battery can 602, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 602, the battery element in which the positive electrode, the negative electrode, and the separator are wound is interposed between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to those of the above coin-type storage battery and the laminated storage battery can be used.

The positive electrode 604 and the negative electrode 606 can be formed in a manner similar to that of the positive electrode and the negative electrode of the coin-type storage battery described above except that active materials are formed on both sides of the current collectors owing to the winding of the positive electrode and the negative electrode of the cylindrical storage battery. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Further, a structure in which a plurality of positive electrodes, a plurality of negative electrodes, and a plurality of separators are stacked or wound may be employed.

As the positive electrodes and the negative electrodes of the storage battery 300, the storage battery 500, and the storage battery 600, which are described in this embodiment, electrodes formed by the method for forming a storage battery electrode of one embodiment of the present invention are used. Thus, the discharge capacity of the storage batteries 300, 500, and 600 can be increased.

This embodiment can be implemented in combination with any of the other embodiments as appropriate.

Embodiment 5

A storage battery including the storage battery electrode of one embodiment of the present invention can be used for power supplies of a variety of electric devices driven by electric power.

Specific examples of electric devices each utilizing a storage battery including the storage battery electrode of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as a chain saw, smoke detectors, and medical equipment such as dialyzers. Further, industrial equipment such as guide lights, traffic lights, conveyor belts, elevators, escalators, industrial robots, power storage systems, and power storage devices for leveling the amount of power supply and smart grid can be given. In addition, moving objects driven by electric motors using electric power from the storage batteries are also included in the category of electric devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electric devices, the storage battery including the storage battery electrode of one embodiment of the present invention can be used as a main power supply for supplying enough electric power for almost the whole power consumption. Alternatively, in the electric devices, the storage battery including the storage battery electrode of one embodiment of the present invention can be used as an uninterruptible power supply which can supply electric power to the electric devices when the supply of electric power from the main power supply or a commercial power supply is stopped. Still alternatively, in the electric devices, the storage battery including the storage battery electrode of one embodiment of the present invention can be used as an auxiliary power supply for supplying electric power to the electric devices at the same time as the power supply from the main power supply or a commercial power supply.

Figure 8:
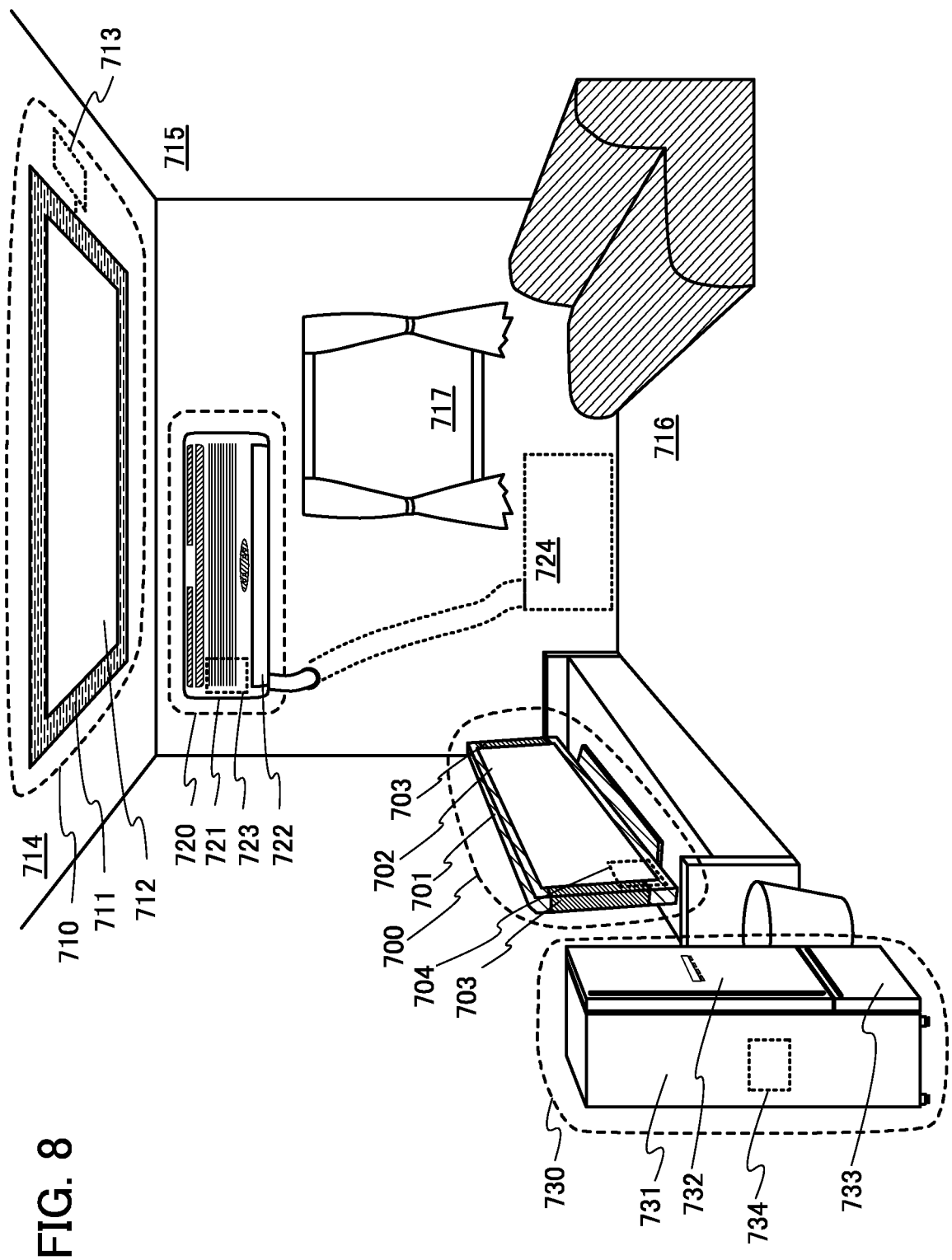
FIG. 8 illustrates examples of an electric device.

FIG. 8 illustrates specific structures of the electric devices. In FIG. 8, a display device 700 is an example of an electric device including a storage battery 704 including the storage battery electrode of one embodiment of the present invention. Specifically, the display device 700 corresponds to a display device for TV broadcast reception and includes a housing 701, a display portion 702, speaker portions 703, and the storage battery 704. The storage battery 704 including the storage battery electrode of one embodiment of the present invention is provided in the housing 701. The display device 700 can receive electric power from a commercial power supply. Alternatively, the display device 700 can use electric power stored in the storage battery 704. Thus, the display device 700 can be operated with the use of the storage battery 704 including the storage battery electrode of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 702.

Note that the display device includes, in its category, all of information display devices for personal computers, advertisement displays, and the like besides for TV broadcast reception.

In FIG. 8, an installation lighting device 710 is an example of an electric device including a storage battery 713 including the storage battery electrode of one embodiment of the present invention. Specifically, the lighting device 710 includes a housing 711, a light source 712, and the storage battery 713. Although FIG. 8 illustrates the case where the storage battery 713 is provided in a ceiling 714 on which the housing 711 and the light source 712 are installed, the storage battery 713 may be provided in the housing 711. The lighting device 710 can receive electric power from a commercial power supply. Alternatively, the lighting device 710 can use electric power stored in the storage battery 713. Thus, the lighting device 710 can be operated with the use of the storage battery 713 including the storage battery electrode of one embodiment of the present invention as an uninterruptible power supply even when electric power cannot be supplied from a commercial power supply due to power failure or the like.

Note that although the installation lighting device 710 provided in the ceiling 714 is illustrated in FIG. 8 as an example, the storage battery including the storage battery electrode of one embodiment of the present invention can be used in an installation lighting device provided in, for example, a wall 715, a floor 716, a window 717, or the like other than the ceiling 714. Alternatively, the storage battery including the storage battery electrode of one embodiment of the present invention can be used in a tabletop lighting device or the like.

As the light source 712, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 8, an air conditioner including an indoor unit 720 and an outdoor unit 724 is an example of an electric device including a storage battery 723 including the storage battery electrode of one embodiment of the present invention. Specifically, the indoor unit 720 includes a housing 721, an air outlet 722, and the storage battery 723. Although FIG. 8 illustrates the case where the storage battery 723 is provided in the indoor unit 720, the storage battery 723 may be provided in the outdoor unit 724. Alternatively, the storage batteries 723 may be provided in both the indoor unit 720 and the outdoor unit 724. The air conditioner can receive electric power from a commercial power supply. Alternatively, the air conditioner can use electric power stored in the storage battery 723. Particularly in the case where the storage batteries 723 are provided in both the indoor unit 720 and the outdoor unit 724, the air conditioner can be operated with the use of the storage battery 723 including the storage battery electrode of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 8 as an example, the storage battery including the storage battery electrode of one embodiment of the present invention can be used in an air conditioner in which the functions of an indoor unit and an outdoor unit are integrated in one housing.

In FIG. 8, an electric refrigerator-freezer 730 is an example of an electric device including a storage battery 734 including the storage battery electrode of one embodiment of the present invention. Specifically, the electric refrigerator-freezer 730 includes a housing 731, a door for a refrigerator 732, a door for a freezer 733, and the storage battery 734. The storage battery 734 is provided in the housing 731 in FIG. 8. The electric refrigerator-freezer 730 can receive electric power from a commercial power supply. Alternatively, the electric refrigerator-freezer 730 can use electric power stored in the storage battery 734. Thus, the electric refrigerator-freezer 730 can be operated with the use of the storage battery 734 including the storage battery electrode of one embodiment of the present invention as an uninterruptible power supply even when electric power cannot be supplied from a commercial power supply due to power failure or the like.

Note that among the electric devices described above, a high-frequency heating apparatus such as a microwave oven and an electric device such as an electric rice cooker require high power in a short time. The tripping of a breaker of a commercial power supply in use of an electric device can be prevented by using the storage battery including the storage battery electrode of one embodiment of the present invention as an auxiliary power supply for supplying electric power which cannot be supplied enough by a commercial power supply.

In addition, in a time period when electric devices are not used, particularly when the proportion of the amount of electric power which is actually used to the total amount of electric power which can be supplied from a commercial power supply source (such a proportion referred to as a usage rate of electric power) is low, electric power can be stored in the storage battery, whereby the usage rate of electric power can be reduced in a time period when the electric devices are used. For example, in the case of the electric refrigerator-freezer 730, electric power can be stored in the storage battery 734 in night time when the temperature is low and the door for a refrigerator 732 and the door for a freezer 733 are not often opened or closed. Then, in daytime when the temperature is high and the door for a refrigerator 732 and the door for a freezer 733 are frequently opened and closed, the storage battery 734 is used as an auxiliary power supply; thus, the usage rate of electric power in daytime can be reduced.

This embodiment can be implemented in combination with any of the other embodiments as appropriate.

Embodiment 6

Next, a portable information terminal which is an example of electric devices will be described with reference to FIGS. 9A to 9C.

Figure 9A:
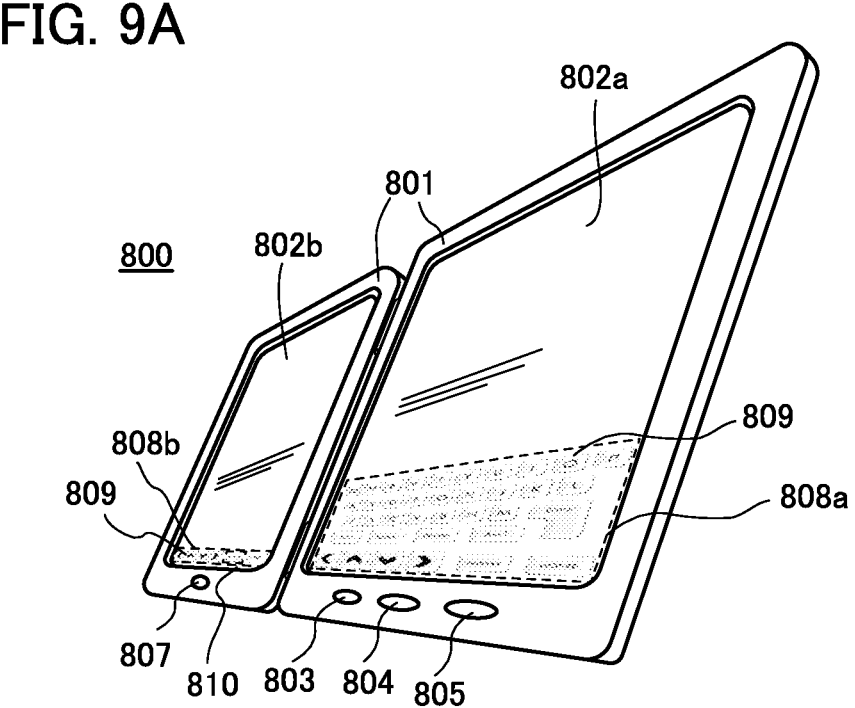
FIGS. 9A to 9C illustrate an example of an electric device.
Figure 9B:
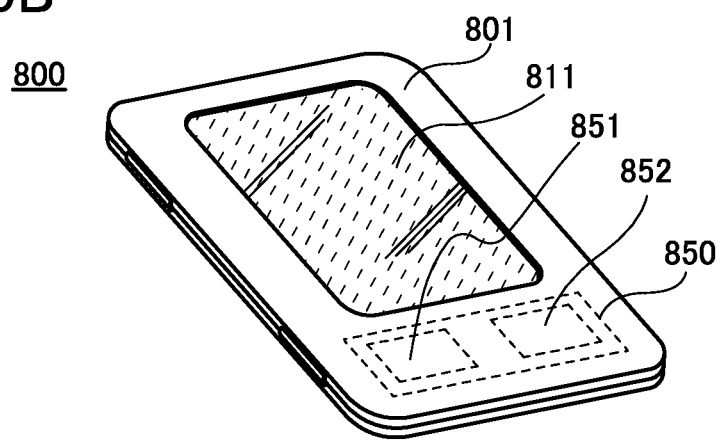

FIGS. 9A and 9B illustrate a tablet terminal 800 which can be folded. FIG. 9A illustrates the tablet terminal 800 in the state of being unfolded. The tablet terminal includes a housing 801, a display portion 802a, a display portion 802b, a display-mode switching button 803, a power button 804, a power-saving-mode switching button 805, and an operation button 807.

A touch panel area 808a can be provided in part of the display portion 802a, in which area, data can be input by touching displayed operation keys 809. Note that half of the display portion 802a has only a display function and the other half has a touch panel function. However, the structure of the display portion 802a is not limited to this, and all the area of the display portion 802a may have a touch panel function. For example, a keyboard can be displayed on the whole display portion 802a to be used as a touch panel, and the display portion 802b can be used as a display screen.

A touch panel area 808b can be provided in part of the display portion 802b like in the display portion 802a. When a keyboard display switching button 810 displayed on the touch panel is touched with a finger, a stylus, or the like, a keyboard can be displayed on the display portion 802b.

Touch input can be performed in the touch panel area 808a and the touch panel area 808b at the same time.

The display-mode switching button 803 allows switching between a landscape mode and a portrait mode, color display and black-and-white display, and the like. The power-saving-mode switching button 805 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display area of the display portion 802*a* is the same as that of the display portion 802*b* in FIG. 9A, one embodiment of the present invention is not particularly limited thereto. The display area of the display portion 802*a* may be different from that of the display portion 802*b*, and further, the display quality of the display portion 802*a* may be different from that of the display portion 802*b*. For example, one of the display portions 802*a* and 802*b* may display higher definition images than the other.

FIG. 9B illustrates the tablet terminal 800 in the state of being closed. The tablet terminal 800 includes the housing 801, a solar cell 811, a charge/discharge control circuit 850, a battery 851, and a DC-DC converter 852. FIG. 9B illustrates an example where the charge/discharge control circuit 850 includes the battery 851 and the DC-DC converter 852. The storage battery including the storage battery electrode of one embodiment of the present invention, which is described in the above embodiment, is used as the battery 851.

Since the tablet terminal 800 can be folded, the housing 801 can be closed when the tablet terminal is not in use. Thus, the display portions 802*a* and 802*b* can be protected, which permits the tablet terminal 800 to have high durability and improved reliability for long-term use.

The tablet terminal illustrated in FIGS. 9A and 9B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 811, which is attached to a surface of the tablet terminal, can supply electric power to a touch panel, a display portion, an image signal processor, and the like. Note that the solar cell 811 can be provided on one or both surfaces of the housing 801 and thus the battery 851 can be charged efficiently.

The structure and operation of the charge/discharge control circuit 850 illustrated in FIG. 9B will be described with reference to a block diagram of FIG. 9C. FIG. 9C illustrates the solar cell 811, the battery 851, the DC-DC converter 852, a converter 853, switches SW1 to SW3, and the display portion 802. The battery 851, the DC-DC converter 852, the converter 853, and the switches SW1 to SW3 correspond to the charge and discharge control circuit 850 in FIG. 9B.

First, an example of operation in the case where electric power is generated by the solar cell 811 using external light will be described. The voltage of electric power generated by the solar cell is raised or lowered by the DC-DC converter 852 so that the electric power can have a voltage for charging the battery 851. When the display portion 802 is operated with the electric power from the solar cell 811, the switch SW1 is turned on and the voltage of the electric power is raised or lowered by the converter 853 to a voltage needed for operating the display portion 802. In addition, when display on the display portion 802 is not performed, the switch SW1 is turned off and the switch SW2 is turned on so that the battery 851 may be charged.

Although the solar cell 811 is described as an example of power generation means, there is no particular limitation on the power generation means, and the battery 851 may be charged with any of the other means such as a piezoelectric element or a thermoelectric conversion element (Peltier element). For example, the battery 851 may be charged with a non-contact power transmission module capable of performing charging by transmitting and receiving electric power wirelessly (without contact), or any of the other charge means used in combination.

Figure 9C:
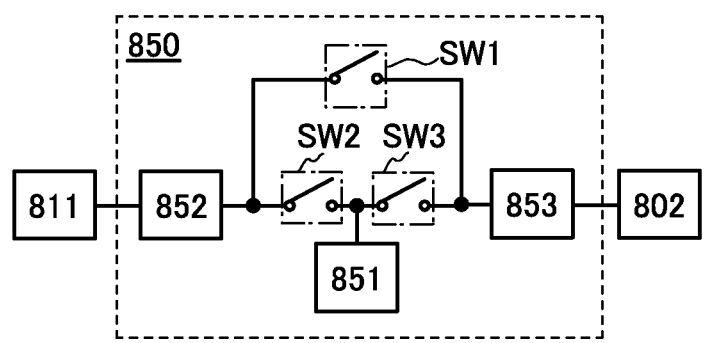

It is needless to say that one embodiment of the present invention is not limited to the electric device illustrated in FIGS. 9A to 9C as long as the electric device is equipped with the storage battery including the storage battery electrode of one embodiment of the present invention, which is described in the above embodiment.

Embodiment 7

Further, an example of the moving object which is an example of the electric devices will be described with reference to FIGS. 10A and 10B.

The storage battery described in the above embodiment can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 10A:
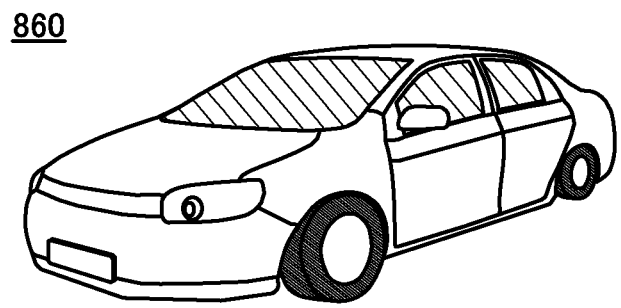
FIGS. 10A and 10B illustrate an example of an electric device.
Figure 10B:
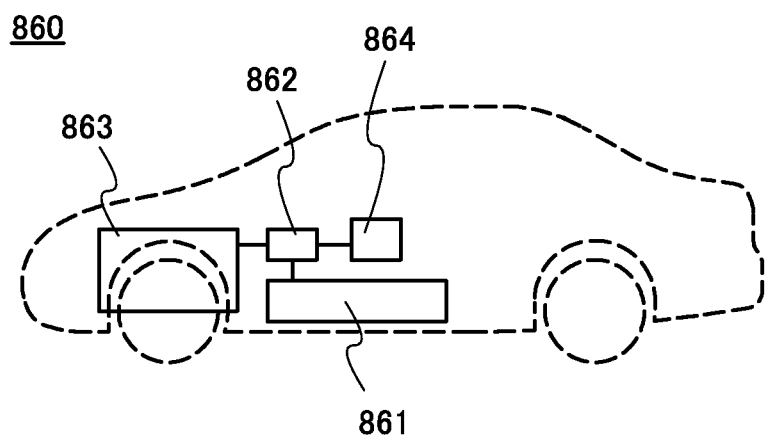

FIGS. 10A and 10B illustrate an example of an electric vehicle. An electric vehicle 860 is equipped with a battery 861. The output of the electric power of the battery 861 is adjusted by a control circuit 862 and the electric power is supplied to a driving device 863. The control circuit 862 is controlled by a processing unit 864 including a ROM, a RAM, a CPU, or the like which is not illustrated.

The driving device 863 includes a DC motor or an AC motor either alone or in combination with an internal-combustion engine. The processing unit 864 outputs a control signal to the control circuit 862 based on input data such as data on operation (e.g., acceleration, deceleration, or stop) of a driver or data during driving (e.g., data on an upgrade or a downgrade, or data on a load on a driving wheel) of the electric vehicle 860. The control circuit 862 adjusts the electric energy supplied from the battery 861 in accordance with the control signal of the processing unit 864 to control the output of the driving device 863. In the case where the AC motor is mounted, although not illustrated, an inverter which converts direct current into alternate current is also incorporated.

The battery 861 can be charged by external electric power supply using a plug-in technique. For example, the battery 861 is charged through a power plug from a commercial power supply. The battery 861 can be charged by converting the supplied power into DC constant voltage having a predetermined voltage level through a converter such as an AC-DC converter. The use of the storage battery including the storage battery electrode of one embodiment of the present invention as the battery 861 can be conducive to an increase in battery capacity, leading to an improvement in convenience. When the battery 861 itself can be more compact and more lightweight as a result of improved characteristics of the battery 861, the vehicle can be lightweight, leading to an increase in fuel efficiency.

Note that it is needless to say that one embodiment of the present invention is not limited to the electric device described above as long as the storage battery of one embodiment of the present invention is included.

This embodiment can be implemented in combination with any of the other embodiments as appropriate.

Example 1

One embodiment of the present invention is specifically described below with an example. Note that one embodiment of the present invention is not limited to the following example.

<Materials & Equipment>

Materials and equipment used in this example will be described below.

As graphite, BF-40AK manufactured by Chuetsu Graphite Works Co., Ltd. was used. Lithium carbonate $Li_2CO_3$ (99.99%, anhydrous) purchased from Kojundo Chemical Laboratory Co., Ltd. was used. Ammonium dihydrogen phosphate $NH_4H_2PO_4$ (99%) and D(+)-glucose (98%, referred to as glucose below) were purchased from Kishida Chemical Co., Ltd. As iron oxalate, $FeC_2O_4.2H_2O$ (98%, dihydrate) was purchased from Kishida Chemical Co., Ltd. L-ascorbic acid (99.6%, referred to as an ascorbic acid below) was purchased from Wako Pure Chemical Industries, Ltd. PVdF No. 7300 (a 5 wt % NMP solution) manufactured by Kureha Corporation was used. As a positive electrode current collector, an aluminum foil covered with a layer substantially formed of carbon black was used. As a reference positive electrode current collector, an aluminum foil covered by application of a polymer-including carbon black dispersion liquid was used. As a negative electrode current collector, a rolled copper foil was used. A mixed solvent of ethylene carbonate (EC) and diethyl carbonate (DEC) (EC:DEC=1 vol:1 vol, battery grade) including 1M of $LiPF_6$ purchased from Kishida Chemical Co., Ltd was used.

For spray drying, a mini spray dryer B-290 manufactured by Nihon BUCHI K.K. was used. For the adhesive tape 180° peeling test, EZGraph manufactured by Shimadzu Corporation was used. For electrode resistance measurement, Loresta GP with PSP-type probes manufactured by Mitsubishi Chemical Analytech, Co., Ltd. was used.

<Synthesis of Graphene Oxide>

Graphene oxide was synthesized by the following method. First, while 20 g of graphite and 690 mL of a concentrated sulfuric acid (96%) were stirred in an ice bath, 75 g of potassium permanganate was slowly added thereto. Then, stirring was performed at 25° C. for 4.5 hours to give Reaction Liquid 1. Next, Reaction Liquid 1 was slowly added to 1380 mL of pure water in an ice bath and was diluted. Next, diluted Reaction Liquid 1 was stirred in an oil bath at ca. 95° C. for 15 minutes to cause a reaction, and then 54 mL of a hydrogen peroxide solution (concentration: 30 wt %) was added in a water bath (room temperature) to inactivate unreacted potassium permanganate. After a solid was collected by centrifugation, cleaning and drying were performed to obtain graphene oxide powder. Here, cleaning was performed by repeating the process consisting of dilution and dispersion with pure water, centrifugation, and collection of a precipitate. Drying was performed with the spray dryer.

<Synthesis of Active Material Particle $LiFePO_4$>

Acetone (dehydrated) was added to $Li_2CO_3$, $FeC_2O_4.2H_2O$, and $NH_4H_2PO_4$ (molar ratio of 1:2:2), and crushing and mixing were performed with a medium stirring mill. A solvent of the mixture was volatilized and baking was performed at 350° C. for 10 hours in a nitrogen atmosphere to give Material 1. Then, glucose (10 wt % with respect to Material 1) and acetone were added to Material 1 and mixed with a wet medium mill, and a solvent was volatilized to give Material 2. Material 2 was baked at 600° C. in a nitrogen atmosphere for 10 hours to give Material 3. Material 3 was microparticulated using acetone with a wet medium mill, that is, dispersed, and a solvent was volatilized to give Material 4. Material 4 was used as active material particles $LiFePO_4$. Note that the crystallite size and specific surface area of Material 4 were found by XRD analysis to be ca. 80 nm and 27 $m^2/g$, respectively.

Figure 11A:
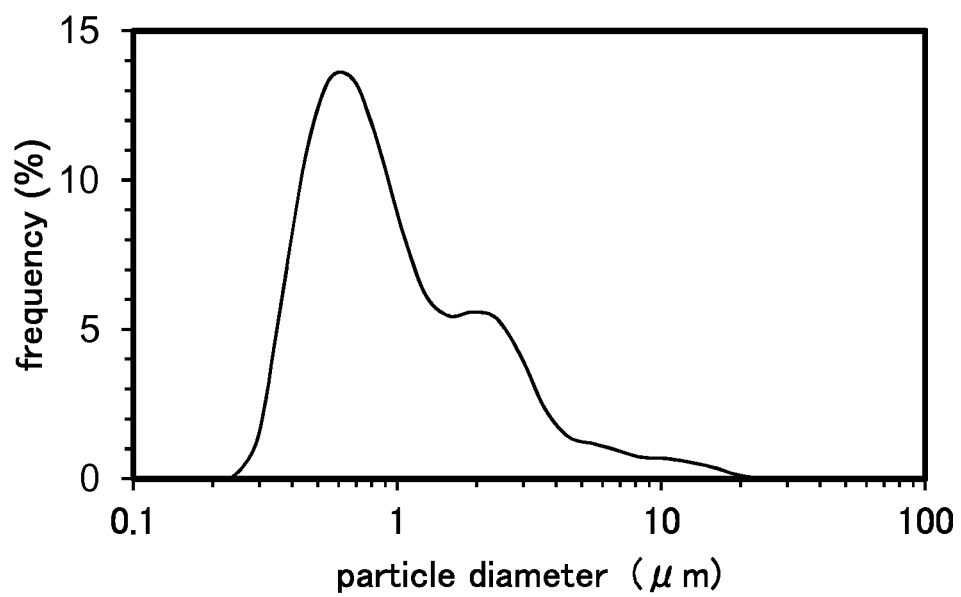
FIGS. 11A and 11B show analysis results of the particle size distribution.
Figure 11B:
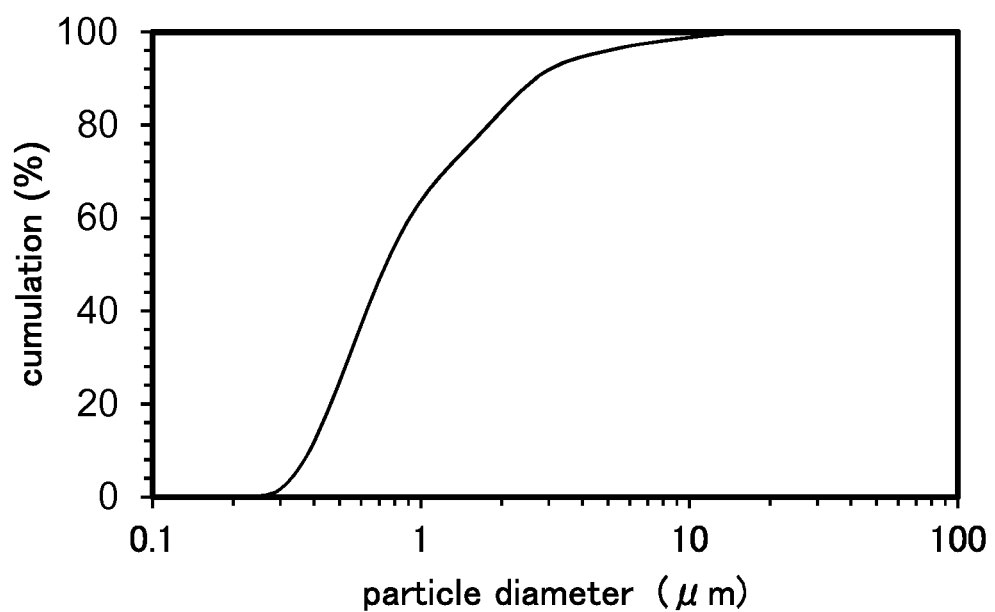

FIGS. 11A and 11B show the particle size distribution of active material particles measured in a water solvent. FIG. 11A shows frequency distribution, and FIG. 11B shows cumulative distribution. The 90% particle diameter (the particle diameter when the cumulative percentage is 90% in the cumulative distribution) was 2.708 μm.

<Electrode Formation>

NMP was added to the active material particles $LiFePO_4$, graphene oxide, and a PVdF solution, and mixed in a thin-film rotary high-speed stirrer. The weight ratio of the materials except for the solvent NMP was as follows: $LiFePO_4$:graphene oxide:PVdF=94.2:0.8:5.0. The obtained slurry mixture was applied onto a positive electrode current collector by a blade method, and dried with a hot wind at temperatures of 65° C. to 75° C.; thus, Electrode 1 including a positive electrode active material layer was formed. Furthermore, a slurry mixture which is an NMP solution including active material particles $LiFePO_4$, graphene oxide, and PVdF is applied to a reference positive electrode current collector by a blade method, and dried with a hot wind; thus, Electrode 2 including a positive electrode active material layer was formed. The weight ratio for materials of Electrode 2 is the same as that for Electrode 1.

Electrode 1 was immersed in an NMP solution including 10 vol % of water, 77 mM of an ascorbic acid, and 75 mM of lithium hydroxide, and a reaction was caused at 60° C. for 1 hour. Then, the reacted Electrode 1 (referred to as Electrode 1a below) was cleaned several times with ethanol. Then, the cleaned Electrode 1a was dried and subjected to heat treatment at 170° C. for 10 hours under vacuum. The heated Electrode 1a was pressed; thus, Electrode A was formed. By shaping Electrode A into a circular shape with a diameter of 12 mm by punching, Positive Electrode A was formed.

Electrode 1 was immersed in an NMP solution including 10 vol % of water, 77 mM of an ascorbic acid, and 75 mM of lithium hydroxide, and a reaction was caused at 60° C. for 1 hour. Then, the reacted Electrode 1 (referred to as Electrode 1b below) was cleaned several times with pure water. Then, the cleaned Electrode 1b was dried and subjected to heat treatment at 170° C. for 10 hours under vacuum. The heated Electrode 1b was pressed; thus, Electrode B was formed. By shaping Electrode B into a circular shape with a diameter of 12 mm by punching, Positive Electrode B was formed.

Electrode 1 was immersed in an aqueous solution including 77 mM of an ascorbic acid and 75 mM of lithium hydroxide, and a reaction was caused at 80° C. for 5 minutes. Then, the reacted Electrode 1 (referred to as Electrode 1c below) was cleaned by being immersed in pure water at 60° C. for 5 minutes. Then, the cleaned Electrode 1c was dried and subjected to heat treatment at 170° C. for 10 hours under vacuum. The heated Electrode 1c was pressed; thus, Electrode C was formed. By shaping Electrode C into a circular shape with a diameter of 12 mm by punching, Positive Electrode C was formed.

Electrode 1 was immersed in an aqueous solution including 77 mM of an ascorbic acid and 75 mM of lithium hydroxide, and a reaction was caused at 80° C. for 15 minutes. Then, the reacted Electrode 1 (referred to as Electrode 1d below) was cleaned by being immersed in pure water at 60° C. for 5 minutes. Then, the cleaned Electrode 1d was dried and subjected to heat treatment at 170° C. for 10 hours under vacuum. The heated Electrode 1d was pressed; thus, Electrode D was formed. By shaping Electrode D into a circular shape with a diameter of 12 mm by punching, Positive Electrode D was formed.

Electrode 1 was immersed in an aqueous solution including 77 mM of an ascorbic acid and 75 mM of lithium hydroxide, and a reaction was caused at 80° C. for 1 hour. Then, the reacted Electrode 1 (referred to as Electrode 1e below) was cleaned by being immersed in pure water at 60° C. for 5 minutes. Then, the cleaned Electrode 1e was dried and subjected to heat treatment at 170° C. under vacuum. The heated Electrode 1e was pressed; thus, Electrode E was formed. By shaping Electrode E into a circular shape with a diameter of 12 mm by punching, Positive Electrode E was formed.

Electrode 1 was immersed in an aqueous solution including 77 mM of an ascorbic acid and 75 mM of lithium hydroxide, and a reaction was caused at 60° C. for 15 minutes. Then, the reacted Electrode 1 (referred to as Electrode if below) was cleaned by being immersed in pure water at 60° C. for 5 minutes. Then, the cleaned Electrode if was dried and subjected to heat treatment at 170° C. for 10 hours under vacuum. The heated Electrode if was pressed; thus, Electrode F was formed. By shaping Electrode F into a circular shape with a diameter of 12 mm by punching, Positive Electrode F was formed.

Electrode 2 was immersed in an aqueous solution including 77 mM of an ascorbic acid and 75 mM of lithium hydroxide, and a reaction was caused at 80° C. In this case, the active material layer and the current collector were separated from each other in a reducing solution. Therefore, Electrode 2 was not used any more.

In Positive Electrode A, the weight of the active material layer was 13.7 mg, and the thickness of the active material layer was 66 urn. When calculated without considering the change in weight from graphene oxide to RGO, that is, with the assumption that the percentage of the active material in the active material layer is 94.2 wt %, the area is 1.13 cm$^2$, the active material weight is 12.9 mg, and the active material layer density is 1.84 g/cm$^3$.

In Positive Electrode B, the weight of the active material layer was 133 mg, and the thickness of the active material layer was 66 µm. When calculated without considering the change in weight from graphene oxide to RGO, that is, with the assumption that the percentage of the active material in the active material layer is 94.2 wt %, the area is 1.13 cm$^2$, the active material weight is 12.3 mg, and the active material layer density is 1.87 g/cm$^3$.

In Positive Electrode C, the weight of the active material layer was 13.1 mg, and the thickness of the active material layer was 62 µm. When calculated without considering the change in weight from graphene oxide to RGO, that is, with the assumption that the percentage of the active material in the active material layer is 94.2 wt %, the area is 1.13 cm$^2$, the active material weight is 12.6 mg, and the active material layer density is 1.91 g/cm$^3$.

In Positive Electrode D, the weight of the active material layer was 13.3 mg, and the thickness of the active material layer was 62 µm. When calculated without considering the change in weight from graphene oxide to RGO, that is, with the assumption that the percentage of the active material in the active material layer is 94.2 wt %, the area is 1.13 cm$^2$, the active material weight is 12.9 mg, and the active material layer density is 1.89 g/cm$^3$.

In Positive Electrode E, the weight of the active material layer was 13.1 mg, and the thickness of the active material layer was 65 µm. When calculated without considering the change in weight from graphene oxide to RGO, that is, with the assumption that the percentage of the active material in the active material layer is 94.2 wt %, the area is 1.13 cm$^2$, the active material weight is 12.3 mg, and the active material layer density is 1.78 g/cm$^3$.

In Positive Electrode F, the weight of the active material layer was 13.2 mg, and the thickness of the active material layer was 62 µm. When calculated without considering the change in weight from graphene oxide to RGO, that is, with the assumption that the percentage of the active material in the active material layer is 94.2 wt %, the area is 1.13 cm$^2$, the active material weight is 12.5 mg, and the active material layer density is 1.89 g/cm$^3$.

<Battery Characteristics>

Positive Electrodes A to F, Li metal as a negative electrode, an EC/DEC electrolytic solution (EC:DEC 1 vol:1 vol) including 1M of LiPF$_6$ as an electrolyte, and porous polypropylene as a separator were used to fabricate 2032-type coin batteries which are referred to as Coin Batteries A to F.

The charge and discharge characteristics of Coin Batteries A to F (25° C.) were measured. Specifically, after charging at a constant current (approximately 0.4 mA) and a constant voltage (4.3 V) is performed, discharging at a constant current was performed. In each of the coin batteries, the charge rate per unit weight of the positive electrode active material was set at 0.2 C, and charging was performed.

Here, a charge rate and a discharge rate will be described. For example, in the case of charging a secondary battery with a certain capacity X[Ah] at a constant current, a charge rate of 1 C means the current value I[A] with which charging is completed in 1 hour, and a charge rate of 0.2 C means I/5 [A] (i.e., the current value with which charging is completed in 5 hours). Similarly, a discharge rate of 1 C means the current value I[A] with which discharging is completed in 1 hour, and a discharge rate of 0.2 C means I/5 [A] (i.e., the current value with which discharging is completed in 5 hours).

In this example, the current value at the time of charging was set with the assumption that the capacity of the positive electrode active material was 170 mAh/g. In other words, the charge rate 0.2 C means a charge with a current value of 34 mA/g. The discharge rate 0.2 C means a discharge with a current value of 34 mA/g. The discharge rate 1 C means a discharge with a current value of 170 mA/g. The discharge rate 10 C means a discharge with a current value of 1.7 A/g.

Figure 12:
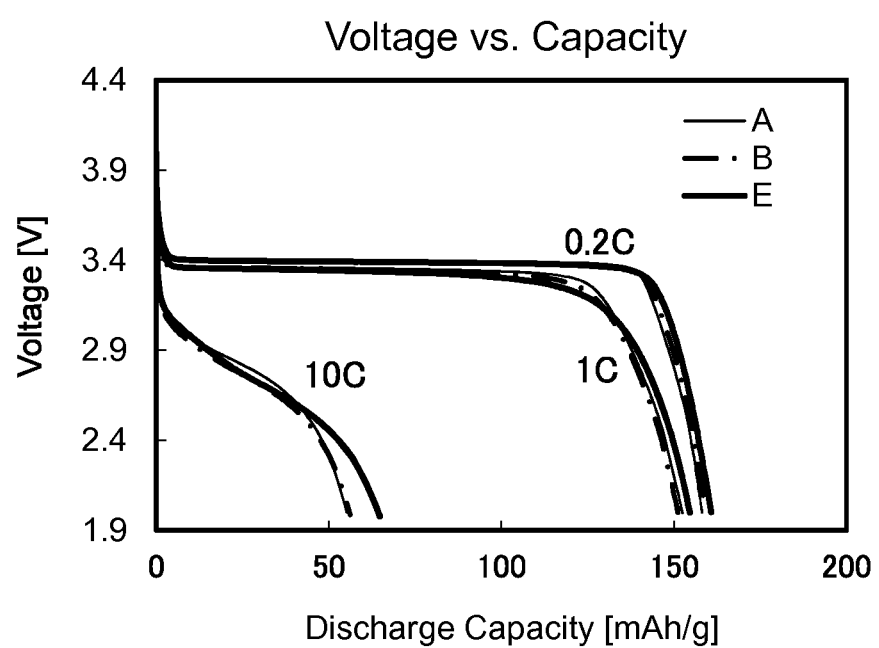
FIG. 12 shows battery characteristics of batteries that use an electrode of one embodiment of the present invention.
Figure 13A:
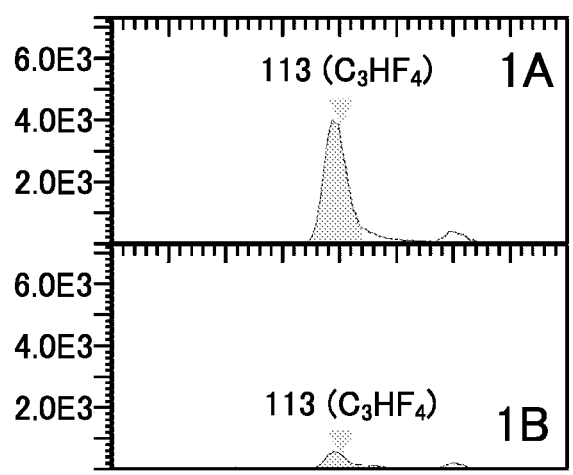
FIGS. 13A to 13D show ToF-SIMS analysis results.
Figure 13B:
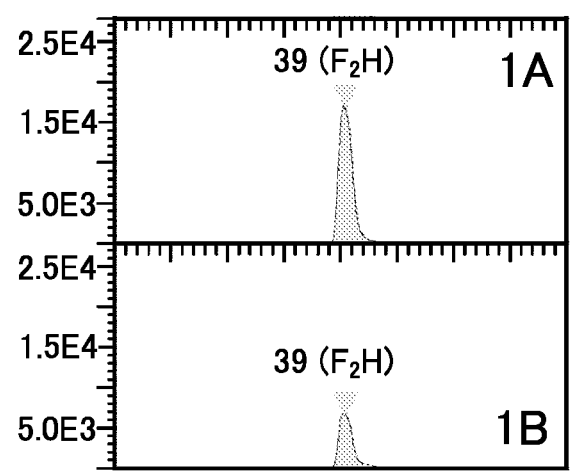
Figure 13C:
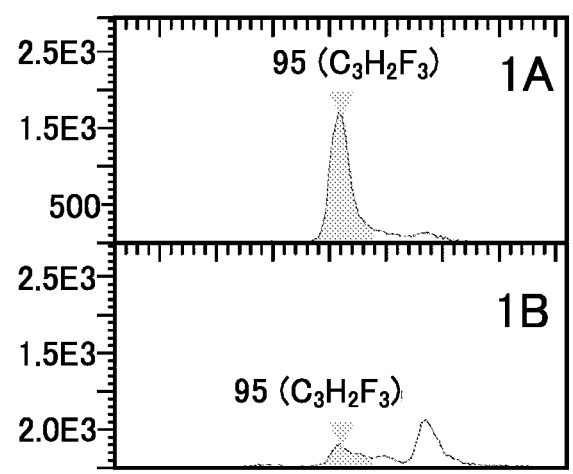
Figure 13D:
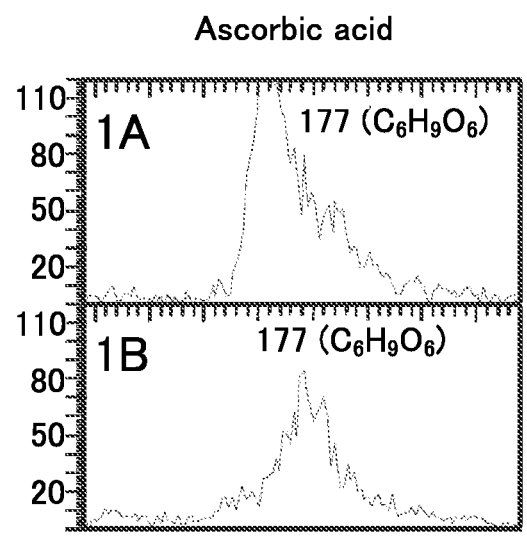
Figure 14A:
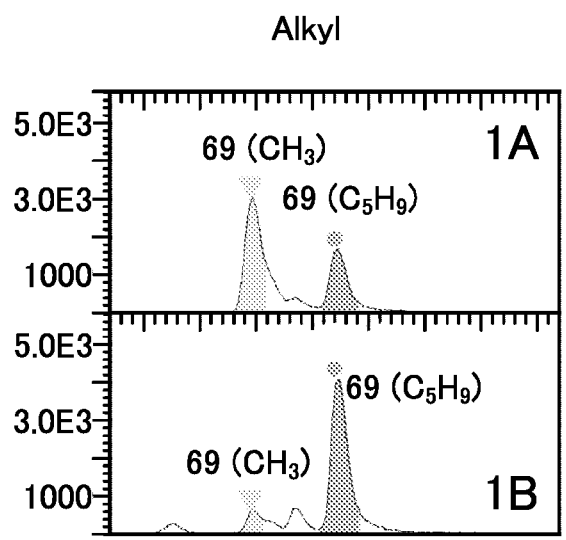
FIGS. 14A to 14D show ToF-SIMS analysis results.
Figure 14B:
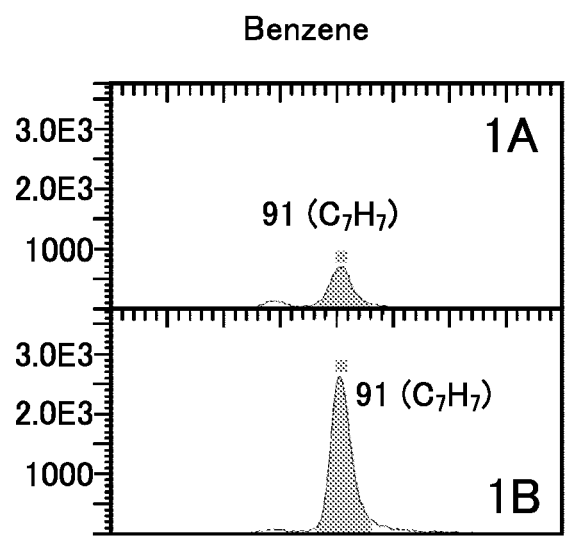
Figure 14C:
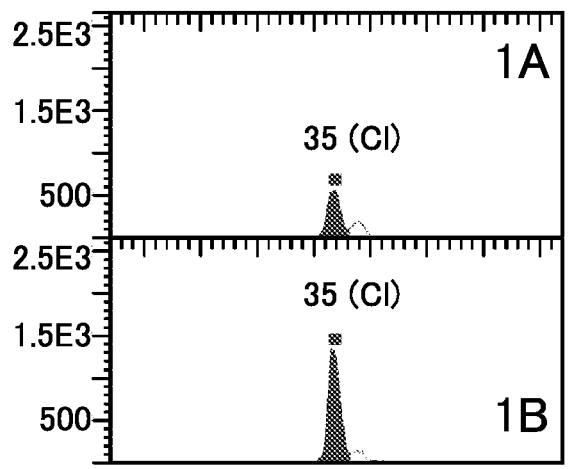
Figure 14D:
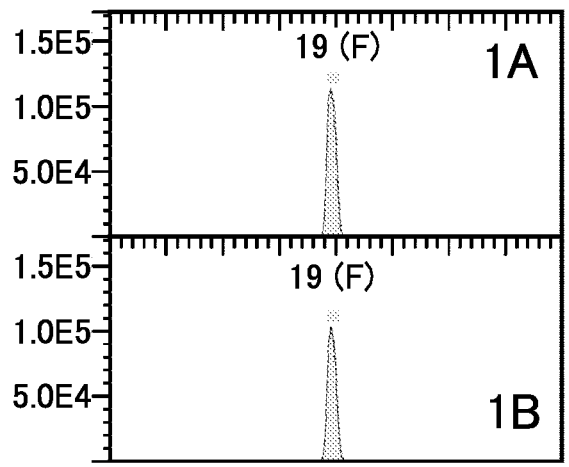

The discharge curves at discharge rates 0.2 C, 1 C, and 10 C of Coin Batteries A, B, and E are shown in FIG. 12. The shapes of the discharge curves are not largely different from each other. Although the discharge curves of Coin Batteries A and B are the same for the most part, the discharge capacity of Coin Battery E at especially a high rate of 10 C is larger than those of Coin Batteries A and B.

The discharge capacities per unit weight of the positive electrode active material at discharge rates 1 C and 10 C in Coin Batteries A to F are shown in Table 1.

TABLE 1

| No. | Reduction Solvent | Conditions | Cleaning Solvent | Capacity [mAh/g] 1 C | 10 C |
|---|---|---|---|---|---|
| A | NMPaq | 60° C. 60 min | EtOH | 152 | 55 |
| B | NMPaq | 60° C. 60 min | $H_2O$ | 151 | 56 |
| C | $H_2O$ | 80° C. 5 min | $H_2O$ | 152 | 50 |
| D | $H_2O$ | 80° C. 15 min | $H_2O$ | 151 | 57 |
| E | $H_2O$ | 80° C. 60 min | $H_2O$ | 155 | 65 |
| F | $H_2O$ | 60° C. 15 min | $H_2O$ | 152 | 56 |

By comparing Coin Batteries C to E, which are different from each other only in the reduction time in formation of the positive electrode, it was found that the discharge capacity depends on the reduction time. Moreover, Coin Batteries D and F with the reduction time of only 15 minutes showed discharge capacities equivalent to those of Coin Batteries A and B with the reduction time of 1 hour.

<Peeling Force Test>

The adhesive tape 180° peeling test (related standard: ISO29862:2007) of Electrodes A and B was performed. Specifically, the active material layer was fixed, and the force necessary for the peeling (peeling force) was measured by peeling the current collector off from the fixed active material layer at the 180° direction. As described above, Electrode A and Electrode B use different cleaning solvents after the chemical reduction.

The peeling forces of Electrode A and Electrode B were 0.97 N and 130 N, respectively. This suggests that immersion in pure water increases the peeling force and thus makes it difficult to peel the current collector from the active material layer.

<ToF-SIMS Analysis>

Electrode A and Electrode B were analyzed by Time-of-flight secondary ion mass spectrometry (ToF-SIMS). As described above, Electrode A and Electrode B use different cleaning solvents after the chemical reduction. Note that the ascorbic acid and a derivative thereof were not able to be analyzed by ToF-SIMS owing to interfering ions.

FIGS. 13A to 13D and FIGS. 14A to 14D show ToF-SIMS analysis results. More peaks of $C_3H_2F_3$ ions and $C_3HF_4$ ions were detected in Electrode A than in Electrode B. These ions are derived from PVdF. More peaks of Cl ions, which are halogen ions, and $C_7H_7$ ions, which are hydrocarbon ions, were detected in Electrode B than in Electrode A. Although not shown in the data, in Electrode 8, detected peaks of $C_3H_2F_3$ ions and $C_3HF_4$ ions varied in the detected amount depending on the measured area. These results might indicate the occurrence of PVdF modification, that is, elimination of hydrogen fluoride. More specifically, a reason for the detection of more Cl ions might be that the impurity Cl was caught after elimination of hydrogen fluoride. The elimination of hydrogen fluoride seems to partly form a polyene structure. In addition, the formed polyene structure is presumably cyclized to form an aromatic ring structure. The polyene structure might be detected as a cyclized aromatic ring in ToF-SIMS. Peaks of $Li_2OH$ ions and $Li_3O$ ions were detected both in Electrode A and Electrode B. The number of detected peaks of $Li_3O$ ions in Electrode A was slightly larger than that in Electrode B. This can be considered as the effect of the cleaning with water, but the difference was not so significant. This suggests the possibility of the influence of PVdF modification, rather than merely the effect of the cleaning.

<Electrode Resistance Measurement>

The sheet resistances of Electrodes A, E, and F were measured by a four-terminal four-probe method. Specifically, the active material layer was peeled from the current collector, and the sheet resistance of the active material layer on an insulator was measured. As described above, the reduction solvent and the cleaning conditions are different between Electrode A and Electrodes E and F, and the reduction temperature and time are different between Electrode E and Electrode F.

The sheet resistance of Electrodes A, E, and F were 450 Ω·cm, 11 Ω·cm, 290 Ω·cm, respectively. In other words, the resistance of Electrode E reduced well in the aqueous solution was 10 times or more lower than that of Electrode A. As for battery characteristics, as described above, the discharge capacity at a high rate (10 C) in Electrode E is higher than that in Electrode A, which shows a possibility that the battery characteristics can be related to the sheet resistance. In Electrode 1, a material that can serve as a conductive additive is only graphene oxide. Thus, the reduction in the aqueous solution and cleaning with pure water can lower the resistance of graphene (RGO). This might be because of a reduction in the resistance of the graphene flakes themselves or a reduction in the resistance between graphene flakes. In the former case, the electrode including graphene is increased in performance by being immersed in an aqueous solution. This suggests that the performance is increased not only by reduction with a reducing agent but also immersion in an aqueous solution after the reduction with the reducing agent. The latter case is presumably owing to an improvement in the contact state; in other words, the contact resistance between particles (active material particles including RGO) is lowered because bonding between the particles and a binder that bonds the particles is improved and thus bonding between the particles becomes stronger. If it is considered in this way, in the case where a metal foil covered with a carbon particle is used as the current collector, the contact resistance between the current collector and the active material layer is also affected. Note that the contact resistance between the current collector and the active material layer is initially low enough and normally negligible. For storage or after long-term use, peeling between the current collector and the active material layer is observed in some cases, and the contact resistance might have an influence on cycle performance and calendar life (storage characteristics).

CONCLUSION

In this example, the influence of the combination of the modified PVdF and graphene was examined, and it was suggested that a polyene structure or an aromatic ring structure is formed by PVdF modification and this PVdF modification is caused by the contact with an aqueous solution including pure water.

This application is based on Japanese Patent Application serial no. 2014-111254 filed with Japan Patent Office on May 29, 2014, the entire contents of which are hereby incorporated by reference.

What is claimed is:

1. A method for forming an electrode comprising:
   forming a mixture comprising an active material particle, graphene oxide, and a poly(vinylidene fluoride);
   providing the mixture over a current collector; and dehydrofluorinating the poly(vinylidene fluoride) by treating the mixture in a solution comprising a polar solvent and a reducing agent.

2. The method for forming an electrode according to claim 1, wherein the polar solvent comprises at least one of water, methanol, ethanol, acetone, tetrahydrofuran, dimethylformamide, 1-methyl-2-pyrrolidone and dimethyl sulfoxide.

3. The method for forming an electrode according to claim 1, wherein the reducing agent is a material having a LUMO level of higher than or equal to −5.0 eV and lower than or equal to −3.8 eV.

4. The method for forming an electrode according to claim 1, wherein the reducing agent comprises at least one of ascorbic acid, hydrazine, dimethyl hydrazine, hydroquinone, tetra-butyl ammonium bromide, $NaBH_4$ and N,N-diethylhydroxylamine.

5. The method for forming an electrode according to claim 1,
wherein a polyene structure or an aromatic ring structure is formed in the poly(vinylidene fluoride) by the dehydrofluorination.

6. A method for forming an electrode comprising:
forming a layer over a metal layer, the layer comprising a carbon particle;
forming a mixture comprising an active material particle and a poly(vinylidene fluoride);
providing the mixture over the layer; and
dehydrofluorinating the poly(vinylidene fluoride) by treating the mixture in a solution comprising a polar solvent and a reducing agent.

7. The method for forming an electrode according to claim 6, wherein the polar solvent comprises at least one of water, methanol, ethanol, acetone, tetrahydrofuran, dimethylformamide, 1-methyl-2-pyrrolidone and dimethyl sulfoxide.

8. The method for forming an electrode according to claim 6, wherein the reducing agent is a material having a LUMO level of higher than or equal to −5.0 eV and lower than or equal to −3.8 eV.

9. The method for forming an electrode according to claim 6, wherein the reducing agent comprises at least one of ascorbic acid, hydrazine, dimethyl hydrazine, hydroquinone, tetra-butyl ammonium bromide, $NaBH_4$ and N,N-diethylhydroxylamine.

10. The method for forming an electrode according to claim 6,
wherein a polyene structure or an aromatic ring structure is formed in the poly(vinylidene fluoride) by the dehydrofluorination.

* * * * *